(12) United States Patent
Nagai et al.

(10) Patent No.: US 9,930,875 B2
(45) Date of Patent: Apr. 3, 2018

(54) ANTI-REVERSE DEVICE FOR FISHING SPINNING REEL

(71) Applicant: Globeride, Inc., Tokyo (JP)

(72) Inventors: Ryou Nagai, Tokyo (JP); Takashi Shibata, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 287 days.

(21) Appl. No.: 14/862,868

(22) Filed: Sep. 23, 2015

(65) Prior Publication Data
US 2016/0088824 A1    Mar. 31, 2016

(30) Foreign Application Priority Data

Sep. 30, 2014  (JP) ................................ 2014-201706
Jul. 14, 2015   (JP) ................................ 2015-140543
(Continued)

(51) Int. Cl.
*A01K 89/01* (2006.01)
*A01K 89/033* (2006.01)

(52) U.S. Cl.
CPC .......... *A01K 89/0117* (2013.01); *A01K 89/01* (2013.01); *A01K 89/053* (2015.05)

(58) Field of Classification Search
CPC ... A01K 89/01; A01K 89/0117; A01K 89/029
See application file for complete search history.

(56) References Cited

U.S. PATENT DOCUMENTS 4,614,314 A * 9/1986 Ban .................... A01K 89/0117
                                                          242/248
4,919,361 A * 4/1990 Kobayashi ......... A01K 89/0117
                                                          242/247
(Continued)

FOREIGN PATENT DOCUMENTS

JP    58-16066     7/1981
JP    58-121566    8/1983
(Continued)

OTHER PUBLICATIONS

Extended European Search Report dated Jan. 27, 2016 for Appln. No. 15187071.4.
(Continued)

*Primary Examiner* — Emmanuel M Marcelo
(74) *Attorney, Agent, or Firm* — Pillsbury Winthrop Shaw Pittman, LLP

(57) ABSTRACT

An anti-reverse device for a fishing reel according to an embodiment includes an anti-reverse gear provided on a rotator rotated by a handle operation, an anti-reverse pawl to be engaged with the anti-reverse gear, and a cam controlling engagement and disengagement of the anti-reverse pawl with the anti-reverse gear in accordance with a rotational direction of the rotator. The cam includes a friction clip attached to the rotator and rotating together with the rotator with a friction force between the rotator and the friction clip, and a bias member biasing the friction clip in a direction in which a clamping force of the clip member is increased. The friction clip includes two clip members clipping the rotator, a connecting portion connecting the two clip members so as to be openable and closable, and an engaging portion formed in one of the two clip members to engage with the anti-reverse pawl.

17 Claims, 18 Drawing Sheets

(30) Foreign Application Priority Data

| Jul. 14, 2015 | (JP) | 2015-140544 |
| Jul. 14, 2015 | (JP) | 2015-140545 |
| Jul. 14, 2015 | (JP) | 2015-140546 |

(56) References Cited

U.S. PATENT DOCUMENTS

| 4,962,900 | A | * | 10/1990 | Dorbandt | A01K 89/01 242/282 |
| 5,042,741 | A | * | 8/1991 | Aota | A01K 89/0117 242/224 |
| 5,312,063 | A | * | 5/1994 | Hitomi | A01K 89/01 188/82.3 |
| 5,318,243 | A | * | 6/1994 | Hitomi | A01K 89/0117 188/82.4 |
| 5,388,777 | A | * | 2/1995 | Sugahara | A01K 89/0117 188/82.3 |
| 5,443,219 | A | | 8/1995 | Hashimoto | |
| 5,485,969 | A | * | 1/1996 | Yamaguchi | A01K 89/0117 188/71.2 |
| 5,593,102 | A | * | 1/1997 | Yamaguchi | A01K 89/01 242/246 |
| 6,273,351 | B1 | * | 8/2001 | Tsukihiji | A01K 89/0117 242/247 |
| 2005/0274838 | A1 | * | 12/2005 | Sugahara | A01K 89/01 242/306 |
| 2014/0263791 | A1 | * | 9/2014 | Sabtu | A01K 89/01 242/224 |

FOREIGN PATENT DOCUMENTS

| JP | 61-12372 U | 1/1986 |
| JP | 2003-250401 | 9/2003 |
| JP | 2003-265078 A | 9/2003 |
| JP | 2008-109884 A | 5/2008 |

OTHER PUBLICATIONS

Non-Final Office Action issued in Japanese Patent Application 2014-201706 dated Aug. 22, 2017 with English translation.
First Office Action Chinese Patent Application No. 201510631595.5 dated Sep. 26, 2017 with English translation.

* cited by examiner

ANTI-REVERSE DEVICE FOR FISHING SPINNING REEL

CROSS-REFERENCE TO RELATED APPLICATIONS

This application is based on and claims the benefit of priority from Japanese Patent Application Serial Nos. 2014-201706 (filed on Sep. 30, 2014), 2015-140543 (filed on Jul. 14, 2015), 2015-140544 (filed on Jul. 14, 2015), 2015-140545 (filed on Jul. 14, 2015), and 2015-140546 (filed on Jul. 14, 2015), the contents of which are hereby incorporated by reference in their entirety.

TECHNICAL FIELD

The present disclosure relates to an anti-reverse device for fishing spinning reel.

BACKGROUND

Fishing spinning reels have an anti-reverse device for preventing rotation of a rotor in a fishing line releasing direction (hereunder referred to as a "backward rotation"). The anti-reverse device typically includes an anti-reverse gear (ratchet) rotating integrally with rotors such as a handle shaft and a pinion shaft, and an anti-reverse pawl (ratchet pawl) engaging with the anti-reverse gear when the rotors rotate in the backward direction.

Conventional anti-reverse devices are disclosed in, for example, Japanese Patent Application Publication 2003-250401 (the "'401 Publication") and Japanese Utility Model Application Publication Sho. 58-16066 (the "'066 Publication"). The anti-reverse device disclosed in the '401 Publication and the '066 Publication has a friction action member (cam) that raises the anti-reverse pawl when a rotor rotates in a fishing-line winding direction (hereunder referred to as "forward rotation"). In this manner, it is possible to prevent a sound from being made when the anti-reverse pawl moves away from the trajectory of teeth of the anti-reverse gear during the forward rotation of the rotor and the anti-reverse pawl passes the tip of each tooth of the anti-reverse gear.

The cam described in the '401 Publication includes a friction clip that is attached to rotators rotated by the rotation of a rotor when the fishing line is released and a rotational operation of a handle. The friction clip member rotates together with the rotators due to the friction force caused between the rotators and the friction clip. The cam further includes a coil spring biasing a clamping force of the friction clip against the rotators. The friction clip includes two clip members clipping the rotators and a connecting portion that connects the two clip members such that they are openable and closable. The connecting portion serves as a protrusion that is situated at a radially-outer side and engages with the anti-reverse pawl. When the rotators rotate in the forward rotational direction of the rotor, the cam pushes the anti-reverse pawl via the protrusion and thereby the anti-reverse pawl is raised such that it is about to come off from the trajectory of the anti-reverse gear. The cam rotates together with the rotators so the protrusion receives a reactive force from the anti-reverse pawl when the protrusion raises the anti-reverse pawl, however the cam can securely raise the anti-reverse pawl against the reactive force. Once the cam raises the anti-reverse pawl, the protrusion is kept engaging with the anti-reverse pawl and the forward rotation of the cam is restricted.

In the above-described conventional anti-reverse device, the frictional force between the rotators and the cam is generated when the rotor rotates in the forward direction so that it hampers a smooth rotation of the rotators. Moreover, the clip member tends to be worn out quickly due to the friction between the clip member and the rotators.

In the anti-reverse device of the '401 Publication, the circumference of the rotator is supported by the entire circumference of the inner periphery of the friction clip member as it tightly contacts with the friction clip member. Therefore, the friction clip member may often contact with the rotator in an unsymmetrical manner and it may destabilize the friction force generated between the rotator and the friction clip member.

In addition, water and foreign substances may easily penetrate into the anti-reverse device of the '401 Publication. In order to prevent this, a casing member that covers the cam, the anti-reverse gear and the anti-reverse pawl disposed in front of the reel body is provided to protect the cam from shocks, water and foreign substances. However, the casing body is made relatively large in order to cover all of the anti-reverse gear, the anti-reverse pawl, and the cam. This increases the size of the fishing spinning reel. Consequently, the weight of the fishing spinning reel is increased and may degrade the operability of the reel.

SUMMARY

The present disclosure addresses at least a part of the above-described disadvantages of the conventional anti-reverse device.

One object of the disclosure is to provide an anti-reverse device for a fishing reel which can realize a smooth line-retrieving rotational operation while maintaining the anti-reverse feature.

Another object of the disclosure is to provide an anti-reverse device for a fishing reel which can stabilize a friction force exerted by a clip member against a rotator.

Another object of the disclosure is to provide a small-sized fishing spinning reel in which the anti-reverse device can be protected.

Another object of the disclosure is to provide an anti-reverse device for a fishing reel in which assembling of a cam to the rotator is made easier.

The above-described and other objects will be will be apparent with reference to the entire description in this specification.

An anti-reverse device for a fishing reel according to an embodiment of the disclosure includes an anti-reverse gear provided on a rotator rotated by a handle operation, an anti-reverse pawl to be engaged with the anti-reverse gear, and a cam controlling engagement and disengagement of the anti-reverse pawl with the anti-reverse gear in accordance with a rotational direction of the rotator. The cam includes a friction clip attached to the rotator and rotating together with the rotator with a friction force between the rotator and the friction clip, and a bias member biasing the friction clip in a direction in which a clamping force of the friction clip member is increased. The friction clip includes two clip members clipping the rotator, a connecting portion connecting the two clip members so as to be openable and closable, and an engaging portion formed in one of the two clip members to engage with the anti-reverse pawl. In the present disclosure, the "rotator" encompasses a drive shaft sleeve, a handle shaft, and any other components of the fishing reel that rotate together with the drive shaft sleeve or the handle shaft.

According to the embodiment, the rotator and the cam are rotated by the handle operation and the rotation of the cam is restricted when the engaging portion of the cam engages with the anti-reverse pawl. When the rotator is further rotated by the handle operation, a reactive force in the direction opposite to the engagement direction (pushed direction) acts on the engaging portion. In other words, the one of the clip members where the engaging portion is provided receives a load in a direction in which the clip member closes or opens with a fulcrum point of the connecting portion. Here, when the one of the clip members receives the load in the direction in which the clip member opens, a friction force between the friction clip and the rotator is decreased and thereby it is possible to operate the handle with a little effort to wind up the fishing line. Whereas when the one of the clip members receives the load in the direction in which the clip member closes, the friction force between the friction clip and the rotator is increased and thereby it is possible to securely prevent the reverse rotation when the fishing line is released. Therefore, according to the embodiment, it is possible to change the operability of the handle by changing the friction force between the friction clip and the rotator before and after the engagement with the anti-reverse pawl. Moreover, in the embodiment, the engaging portion serves as a switch-control section for the anti-reverse pawl. Therefore, design constraints for the connecting portion may be reduced and the design freedom of the anti-reverse device can be increased.

In one embodiment of the disclosure, the one of the clip members on which the engaging portion is provided is arranged in a forward rotational direction with respect to the connecting portion.

According to this embodiment, when the rotator rotates in the forward direction by the handle operation, the clip member receives the load in which the clip member moves to be opened and the friction force between the rotator and the clip member is decreased. As a result, the rotator and the rotor can rotate smoothly. Whereas when the rotor tries to reverse, the one of the clip member receives the reactive force in the direction in which the clip member closes and the friction force between the rotator and the clip member increases. Consequently, the rotor can securely rotate to push (pivot) the anti-reverse pawl without idling although it receives the reactive force from the anti-reverse pawl.

In one embodiment of the disclosure, the engaging portion is a protrusion protruding radially outward from the one of the clip members, and the protrusion is configured to engage in a concave portion of the anti-reverse pawl.

In one embodiment of the disclosure, the engaging portion is disposed in a tip end portion of the one of the clip members.

According to this embodiment, the distance between the connecting portion (the fulcrum point) and the engaging portion (the point where the force is applied) that receives the reactive force from the anti-reverse pawl can be made large and thereby the load acts on the clip member (the point of action) can be increased. Consequently it is possible to change the friction force effectively.

In one embodiment of the disclosure, at least one contact portion is provided on each of the two clip members, the contact portion protruding radially inward from an inner peripheral surface of the clip member to contact the rotator.

According to this embodiment, a contact area between the friction clip and the rotator is decreased, and the clamping force exerted by the friction clip is concentrated on the contact portions. Consequently the friction contact state is made stable. As a result, it is possible to stabilize the engagement and disengagement control feature and to reduce the size of the cam.

In one embodiment of the disclosure, the contact portion is situated closer to the tip end portion of the clip member where the engaging portion is provided.

According to this embodiment, since the engaging portion engages with the anti-reverse pawl, the load acts on the clip member in the direction in which the clip member opens or closes with the fulcrum point of the connecting portion. Here, the load acting on the clip member largely acts on the tip end portion which is farthest from the fulcrum (the connecting portion) as viewed as a whole. For this reason, it is possible to effectively change the friction force because the contact portion is provided in the tip end portion of the clip member in the above-described configuration.

In one embodiment of the disclosure, the number of the contact portions provided on the one of the two clip members in which the engaging portion is provided is larger than the number of the contact portions provided on other of the two clip members.

According to this embodiment, since the engaging portion engages with the anti-reverse pawl, the load acts on the clip member in the direction in which the clip member opens or closes with the fulcrum point of the connecting portion. Therefore, it is possible to change the friction force effectively by arranging more contact portions in the clip member on which the load acts.

In one embodiment of the disclosure, three contact portions are provided, and the three contact portions are arranged circumferentially on the inner peripheral surface of the two clip members at an equal interval.

According to this embodiment, it is possible to stabilize the contact of the contact portion with the rotator while the number of the contact portions to be provided is limited.

In one embodiment of the disclosure, the two clip members are formed in individual bodies separated from each other, one ends of the two clip members are axially supported and other ends of the two clip members are connected to each other by the bias member.

In one embodiment of the disclosure, the cam is housed within a cylinder portion formed in the reel body.

According to the embodiment, since the cam is housed within the cylinder portion, it is possible to protect the cam from shocks, water, foreign substances and the like.

In one embodiment of the disclosure, the two clip members are integrally formed as an inseparable single body.

According to this embodiment, it is possible to make the assembling of the clip members to the rotator easier since the clip members are inseparable from each other.

In one embodiment of the disclosure, the two clip members and the connecting portion are integrally formed as an inseparable single component.

According to this embodiment, it is possible to reduce the number of the components and to reduce the number of steps in manufacturing and the labor of assembling.

In one embodiment of the disclosure, the two clip members are formed in individual bodies separated from each other, and the two clip members are inseparably connected to each other by the connecting portion.

According to this embodiment, it is possible to form the two clip members with different materials. For instance, one of the two clip members that tends to be worn out quickly can be made of a metal material.

A fishing reel according to one embodiment of the disclosure includes the above-described anti-reverse device. The fishing reel may be, for example, a spinning reel. The fishing spinning reel according to one embodiment includes a reel body having a cylinder portion protruding in a front direction, a drive shaft sleeve rotatably supported within the cylinder portion, and a rotor coupled to the drive shaft sleeve. In the embodiment, an opening is formed in a side wall of the cylinder portion, and the anti-reverse device includes an anti-reverse gear formed in the drive shaft sleeve and disposed within the cylinder portion, a cam attached on the drive shaft sleeve and disposed within the cylinder portion, and an anti-reverse pawl disposed within the opening to face the anti-reverse gear and the cam.

According to this embodiment, since the anti-reverse pawl is provided in the opening in the side wall of the cylinder portion, the possibility that water and foreign substances enter through the opening is reduced. Consequently, the anti-reverse gear and the cam disposed within the cylinder portion are protected from the shocks, water, and foreign substances. Moreover, the engagements of the anti-reverse pawl (the tip end portion engaged with a teeth of the anti-reverse gear and an engaged portion in which the engaging portion (the protrusion) of the cam engages) face the side where the anti-reverse gear and the cam are provided, in other words, the inner side of the cylinder portion so that water and foreign substances are less likely to stick to the engagements of the anti-reverse pawl. Moreover, only the anti-reverse gear and the cam are housed within the cylinder portion so that the size of the cylinder portion can be made relatively smaller than the case where the all of the anti-reverse gear, the anti-reverse pawl, and the cam are housed therein. Furthermore since the anti-reverse pawl is disposed in the opening which is a part of the cylinder portion, it is possible to reduce the space which the cylinder portion and the anti-reverse pawl occupy. As described above, according to the embodiment, it is possible to realize the protection of the anti-reverse device and reduction in the size of the fishing spinning reel.

In one embodiment of the disclosure, a bearing for supporting the drive shaft sleeve rotatably is fitted within the cylinder portion, and an outer diameter of the cam is smaller than an outer diameter of the bearing.

According to this embodiment, the bearing can be fitted to the cylindrical portion from the outside after the cam attached to the drive shaft sleeve is placed within the cylindrical portion. In this way, the assembly efficiency of the cam and the bearing is enhanced.

As will be apparent from the above, according to the embodiment of the disclosure, it is possible to provide an anti-reverse device for a fishing reel which can realize a smooth line-retrieving operation while maintaining the anti-reverse feature.

According to the other embodiment of the disclosure, it is possible to provide the anti-reverse device for a fishing reel which can stabilize the friction force exerted against the rotator by the clip member.

According to another embodiment of the disclosure, it is possible to provide a small-sized fishing spinning reel in which the anti-reverse device can be protected. According to another embodiment of the disclosure, it is possible to reduce the cost of manufacturing the anti-reverse device by enhancing its production efficiency.

DESCRIPTION OF THE PREFERRED EMBODIMENTS

A fishing spinning reel equipped with an anti-reverse device according to an embodiment will be hereunder described with reference to the accompanying drawings. Note that the anti-reverse device according to embodiments of the disclosure can also be applied to bait reels (double bearing reels). As used herein, "front and rear" and "upper and lower" directions refer to the directions shown in FIG. 1, and "left and right" directions refer to the direction shown in FIG. 2.

Figure 1:
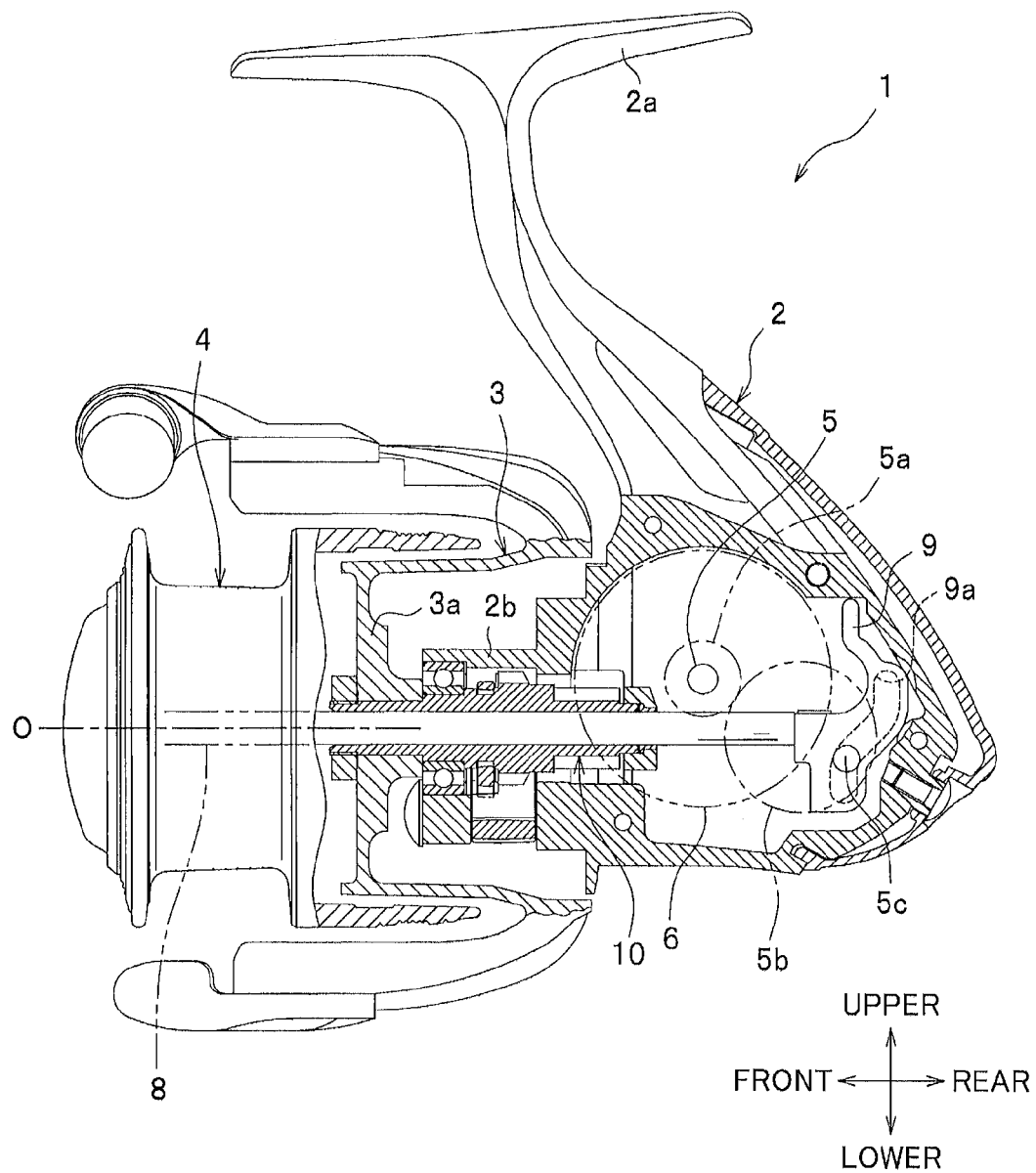
FIG. 1 schematically illustrates a fishing spinning reel having an anti-reverse device according to an embodiment of the disclosure.

Referring to FIG. 1, a fishing spinning reel 1 may include a reel body 2 having a spoof shaft 8 that extends out toward the front direction and a drive shaft sleeve 10, a rotor 3 rotating about a central axis "O" of the spool shaft 8, and a spool 4 attached on a front end of the spool shaft 8 and reciprocating in the front-rear direction. The central axis O of the spool shaft 8 will be hereunder referred to as simply the "central axis O."

On top of the reel body 2 may be provided a leg 2a to be mounted on a fishing rod. The leg 2a may be made hollow. The leg 2a may be further configured such that the fishing rod is attached on top of the leg 2a. The reel body 2 may rotatably support a handle shaft 5 that extends in the left-right direction. A handle (not shown) may be mounted on an end of the handle shaft 5.

The reel body 2 may include a drive gear 6 engaged with the handle shaft 5 and rotating about a left-right axis, and a drive shaft sleeve 10 engaged with and rotated by the drive gear 6.

The drive shaft sleeve 10 is a member having a substantially cylindrical shape and through which the spool shaft 8 penetrates. The drive shaft sleeve 10 may be inserted in a cylindrical portion 2b formed in the front section of the reel body 2. Front and rear ends of the drive shaft sleeve 10 may protrude out from the cylindrical portion 2b.

Figure 2:
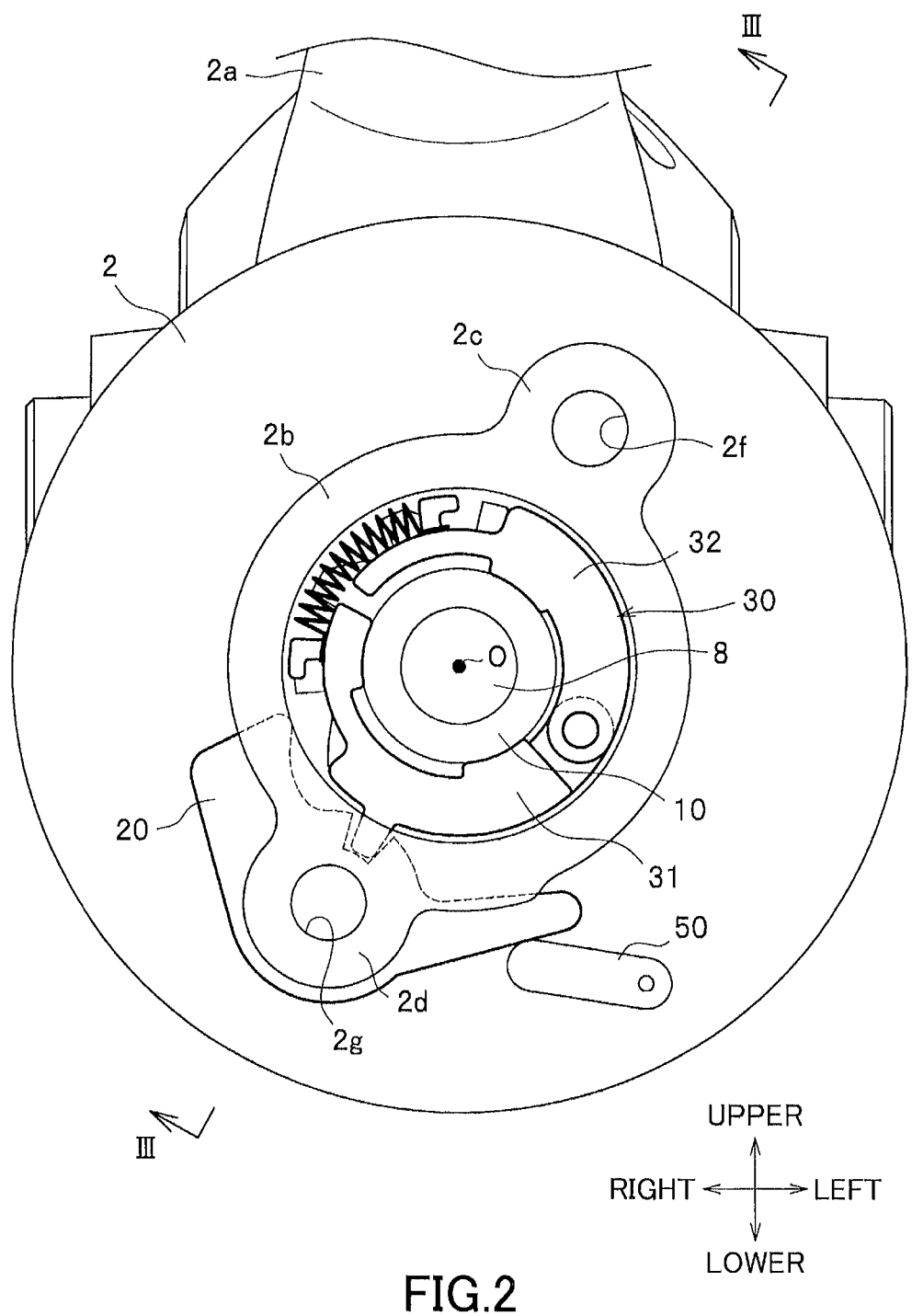
FIG. 2 is an elevation view of an anti-reverse device according to an embodiment when viewed from the front of a reel body.

Referring to FIG. 2, the cylindrical portion 2b according to an embodiment may be formed in a cylindrical shape through which the spool shaft 8 and the drive shaft sleeve 10 penetrate. The cylindrical portion 2b may be formed integrally with the reel body 2. Alternatively, the cylindrical portion 2b according the disclosure may be formed separately from the reel body 2. In this case, the cylindrical portion 2b may be attached to the reel body 2 by various means such as adhesive, screws, fasteners or the like. The cylindrical portion 2b according to the disclosure may be alternatively any shape other than the cylindrical shape.

The cylindrical portion 2b may have bosses 2c, 2d protruding out in the upper-left direction and lower-right direction respectively as viewed from the front. Screw holes 2f, 2g are formed on front end surfaces of the bosses 2c, 2d.

Figure 3:
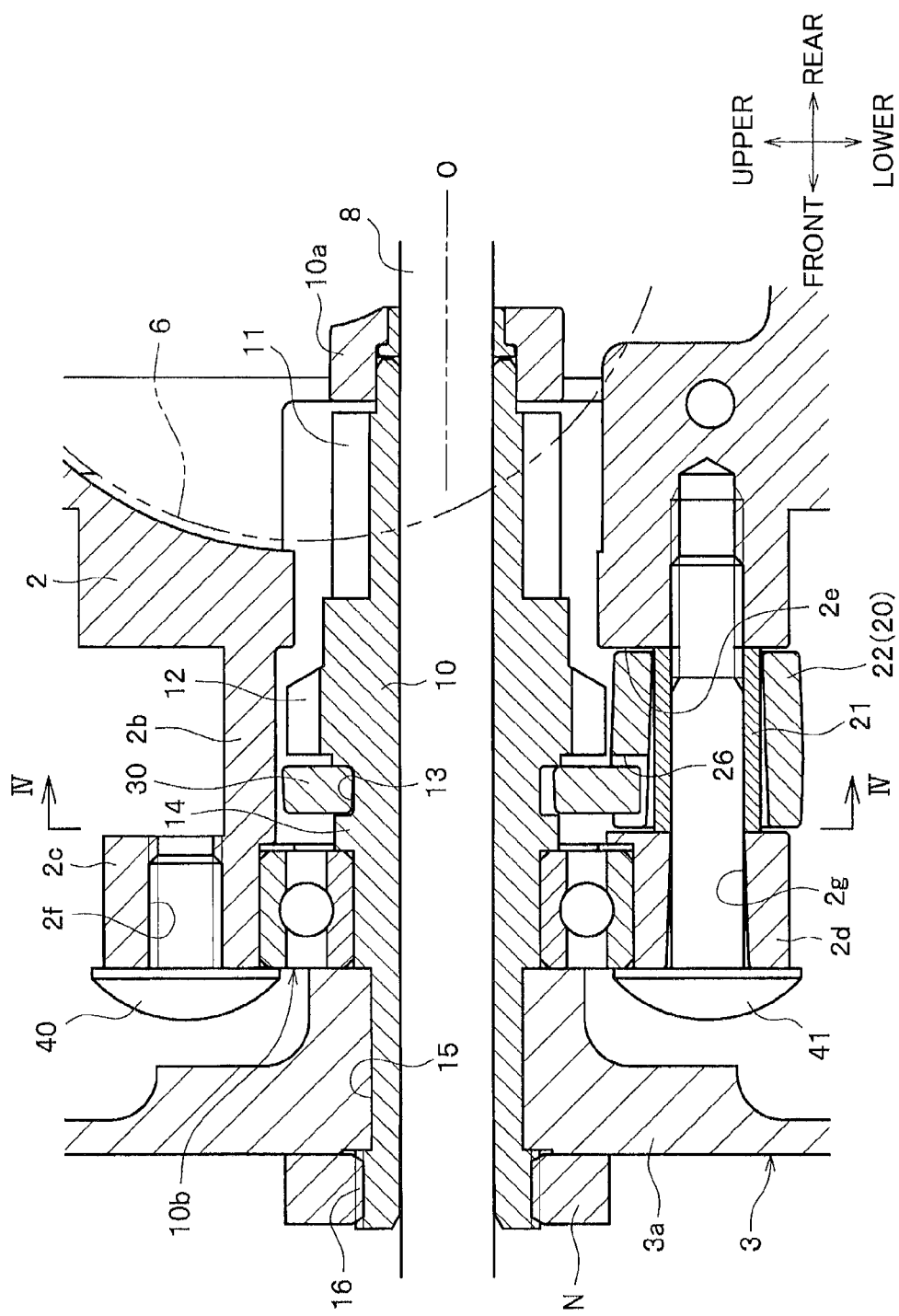
FIG. 3 is a sectional view along the line III-III of FIG. 2.
Figure 4:
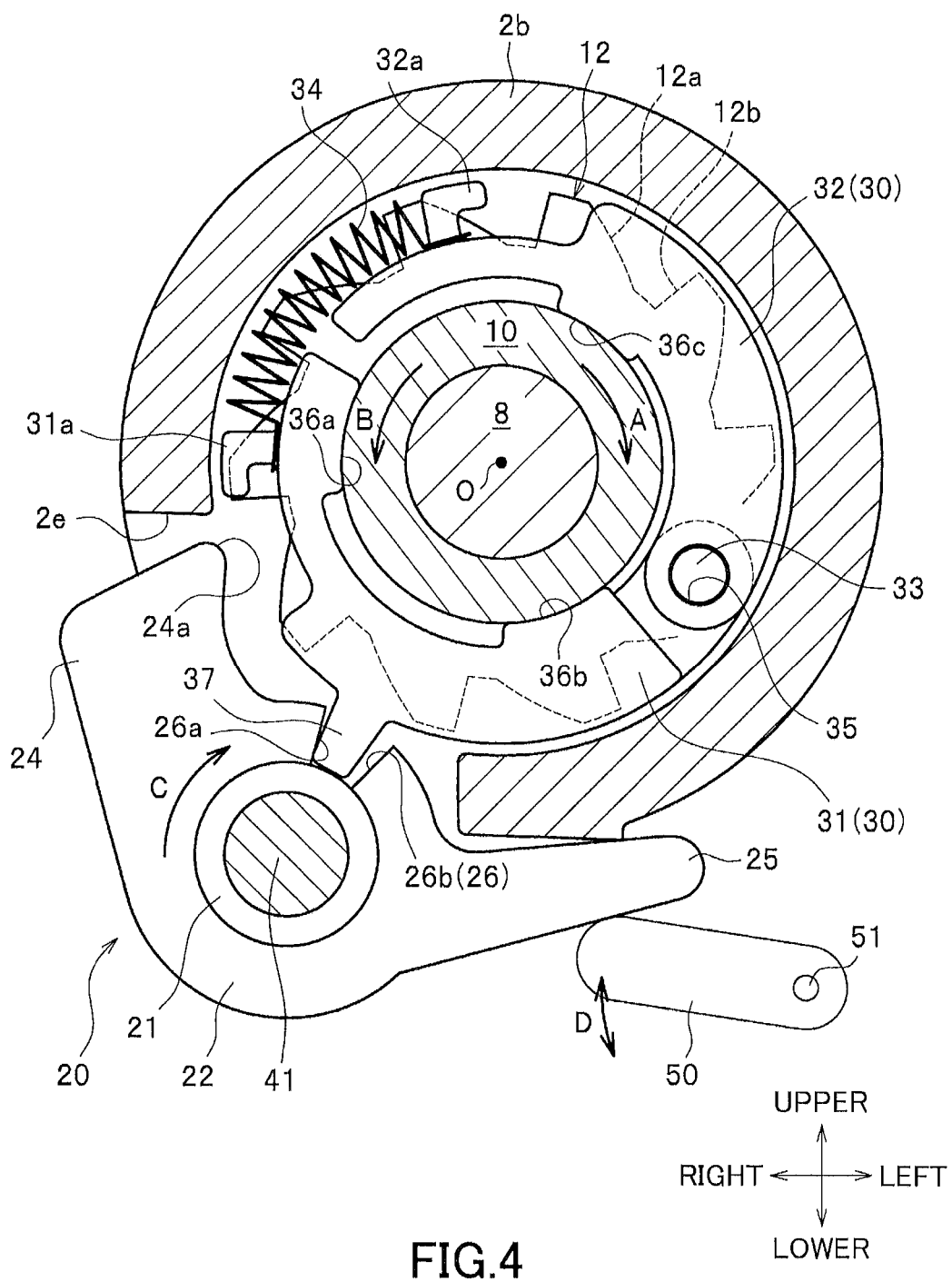
FIG. 4 is a sectional view along the line IV-IV of FIG. 3.

Referring to FIGS. 3 and 4, the boss 2d may have an opening 2e with which the inner side of the cylindrical portion 2b communicates with the outer side of the cylindrical portion. The anti-reverse pawl 20 is disposed in the opening 2e. The anti-reverse pawl 20 will be described in detail later.

Referring to FIG. 3, the drive shaft sleeve 10 may be a substantially cylindrical member and housed within the cylindrical portion 2b from the front side. The rear end of the drive shaft sleeve 10 may be supported by a bearing portion 10a formed in the reel body 2. The front portion of the drive shaft sleeve 10 may be supported by a bearing 10b fitted inside the cylindrical portion 2b. In this manner, the drive shaft sleeve 10 can freely rotate about the central axis O. Screws 40, 41 may be provided in abutting contact with an outer ring of the bearing 10b so that the bearing 10b is retained and does not come off.

On an outer peripheral surface of the drive shaft sleeve 10, a pinion 11, an anti-reverse gear 12, a cam holding groove 13, a convex portion 14, a rotor fitting surface 15, and a screw portion 16 may be arranged in the stated order from the rear side to the front side.

The pinion 11 may be a gear integrally formed with the drive shaft sleeve 10 and engaged with the drive gear 6. A fixing portion 3a of the rotor 3 may be unrotatably fitted on the rotor fitting surface 15 such that the rotor 3 and the drive shaft sleeve 10 rotate in an interlocked manner. In this way, when the drive gear 6 is rotated by the handle operation, the drive force is transmitted to the drive shaft sleeve 10 via the pinion 11 to rotate the drive shaft sleeve 10.

The fixing portion 3a of the rotor 3 is unrotatably fitted on the rotor fitting surface 15 such that the rotor 3 and the drive shaft sleeve 10 form a single body. Consequently, the drive shaft sleeve 10 and the rotor 3 rotate in the same direction (the forward or backward direction). The fixing portion 3a of the rotor 3 is fastened by a nut N screwed into a screw portion 16 and fixed thereon so that it does not fall off.

In this specification, as shown in FIG. 4, a direction in which the rotor 3 rotates when the drive shaft sleeve 10 rotates clockwise as viewed from the front side (when the sleeve rotates in the direction indicated by the arrow A shown in FIG. 4) is referred to as a forward direction of the rotor 3 (rotation in the fishing line winding direction). Whereas a direction in which the rotor 3 rotates when the drive shaft sleeve 10 rotates counterclockwise as viewed from the front side (when the sleeve rotates in the direction indicated by the arrow B shown in FIG. 4) is referred to as a backward direction of the rotor 3 (rotation in the fishing line releasing direction).

The cam holding groove 13 may be a concave-shaped groove for restricting the cam 30 from moving in the front-rear direction. The cam 30 may pinch the drive shaft sleeve 10 to be attached thereto. The cam 30 may be rotatably attached in the cam holding groove 13. The cam 30 is a component which moves (raises) the anti-reverse pawl 20 when the drive shaft sleeve 10 rotates in the forward direction. The cam holding groove 13 may be formed in front of the anti-reverse gear 12 and the cam 30 may be situated adjacent to the anti-reverse gear 12 in the front-rear direction. The cam 30 and the anti-reverse gear 12 face the anti-reverse pawl 20 provided in the opening 2e of the cylindrical portion 2b. The cam 30 and the anti-reverse gear 12 will be described in detail later.

Referring to FIG. 1, the front end of the spool shaft 8 protrudes out from the drive shaft sleeve 10. The spool 4 is attached to the front end of the spool shaft 8. Whereas to the rear end of the spool shaft 8, a spool reciprocation device may be coupled to allow the spool shaft 8 to reciprocate back and forth.

The spool reciprocation device may include an eccentric protrusion 5c provided on an interlocking gear 5b that engages with a gear 5a of the handle shaft 5, a slider 9 attached to the rear end of the spool shaft 8, a guide groove 9a provided in the slider 9 and engaged with the eccentric protrusion 5c, and a guide (not shown) engaged with the slider 9 to facilitate the reciprocation of the slider 9. With the above-described spool reciprocation device, the spool shaft 8 and the spool 4 moves back and forth in the front-rear direction when the handle shaft 5 is rotated by the rotational operation of the handle (not shown), and the fishing line is wounded around the spool 4 in a parallel and uniform manner.

The anti-reverse device according to the embodiment will be now described. The anti-reverse device may include the anti-reverse gear 12, the anti-reverse pawl 20, and the cam 30. Referring to FIG. 4, the anti-reverse gear 12 may be a sawtooth (ratchet) gear integrally formed with the drive shaft sleeve 10. Alternatively, the anti-reverse gear 12 may be formed separately from the drive shaft sleeve 10. The profile of the sawtooth of the anti-reverse gear 12 may be defined by a slope 12a sloping down in the clockwise direction (indicated by the arrow A) as viewed from the front, and a wall 12b provided in the counterclockwise direction (indicated by the arrow B). The wall 12b may extend in the radial direction of the drive shaft sleeve 10.

The anti-reverse pawl 20 may include a pawl body portion 22 formed in a substantially L-shape and made rotatable about the screw 41, a stopper portion 24 extending from the pawl body portion 22 in the forward direction (indicated by the arrow A), and an operated portion 25 extending from the pawl body portion 22 in the backward direction (indicated by the arrow B). The anti-reverse pawl 20 may have a bias member (not shown) that biases the pawl body portion 22 all the time in the clockwise direction (indicated by the arrow C or the direction in which the stopper portion 24 contacts with the anti-reverse gear 12). The pawl body portion 22 may be disposed in the opening 2e of the cylindrical portion 2b to face the anti-reverse gear 12 and the cam 30 within the cylindrical portion 2b.

A holding groove 26 opening toward the cam 30 may be formed in the pawl body portion 22. The holding groove 26 may be formed so as to penetrate the pawl body portion 22 or may be formed as a concave portion with a bottom without penetrating the pawl body portion 22. The holding groove 26 may be formed to engage with a protrusion 37 (which will be hereunder described) of the cam 30. The holding groove 26 according to the embodiment may be formed to notch a part of the pawl body portion 22 and have a first surface 26a facing in the clockwise direction of the anti-reverse pawl 20 and a second surface 26b facing in the counterclockwise direction. In other embodiment of the disclosure, a protrusion may be formed on the pawl body portion 22 and a holding groove that engages with the protrusion may be formed in the cam 30. Instead of the holding groove 26, two convex portions protruding outward from the periphery of the pawl body portion 22 may be formed and the protrusion 37 may be placed between the two convex portions.

On a tip side of the stopper portion 24, a tip end portion 24a protruding into the cylindrical portion 2b may be formed. The tip end portion 24a is to engage with the wall 12b of the anti-reverse gear 12. The thickness of the tip end portion 24a in the axial direction (the front-rear direction) may be decreased as it gets closer to the center of the cylindrical portion 2b. Therefore, the tip end portion 24a can enter the trajectory of the teeth of the anti-reverse gear 12 without contacting the cam 30 disposed in front of the anti-reverse gear 12.

A large part of the opening 2e may be occupied by the pawl body portion 22 and the stopper portion 24. Therefore, water, foreign substances and the like are less likely to enter into the cylindrical portion 2b through the opening 2e.

The operated portion 25 may be disposed such that it is able to contact with a function piece 50 provided on the outside of the cylindrical portion 2b. The function piece 50 is disposed and configured to pivot on an axis 51 in the direction indicated by the arrow D in FIG. 4 by operation of a switch lever (not shown) that switches between a reverse-rotation allowed state and a reverse-rotation inhibited state of the rotor 3. When the switch lever is operated to set the rotor 3 in the reverse-rotation allowed state, the function piece 50 pivots in the clockwise direction. The position of the function piece 50 after it pivoted in the clockwise direction is shown in FIG. 4. Referring to FIG. 4, in the reverse-rotation allowed state of the rotor 3, the operated portion 25 is placed between the periphery of the cylindrical portion 2b and the pivoted function piece 50. Whereas when the switch lever is operated to set the rotor 3 in the reverse-rotation inhibited state, the function piece 50 pivots in the counterclockwise direction.

Referring again to FIG. 4, the cam 30 may include a pair of clip members 31, 32 provided on the outer periphery side of the drive shaft sleeve 10. Each of the pair of clip members 31, 32 may be formed to have a substantially C-shape as viewed from the front side. The clip member 31 may be herein referred to as a first clip member 31 and the clip member 32 may be referred to as a second clip member 32. In the embodiment illustrated in FIG. 4, the first clip member 31 may be separately provided from the second clip member 32. The first clip member 31 may be disposed to face the anti-reverse pawl 20 and the second clip member 32 may be disposed in a position where a 180-degree turn is made with respect to the clip member 31.

A cylindrical connecting pin 33 may be integrally formed on one end of the first clip member 31 that is situated in the counterclockwise rotational direction of the drive shaft sleeve 10 (this end will be hereunder referred to as an "one end" of the first clip member 31). A circular opening 35 may be formed in one end of the second clip member 32 that is situated in the clockwise rotational direction of the drive shaft sleeve 10 (this end will be hereunder referred to as an "one end" of the second clip member 32). The connecting pin 33 is inserted in the circular opening 35 and the first clip member 31 and the second clip member 32 are unified. Consequently, the second clip member 32 is able to pivot on the connecting pin 33 and the other ends of the first and second clip members 31, 32 are made openable and closable.

Hooks 31a, 32a may be provided on the other end of the first clip member 31 and the other end of the second clip member 32 respectively. A stretched coil spring 34 may be attached between the hooks 31a and 32b. The first clip member 31 and the second clip member 32 are attached to the drive shaft sleeve 10 situated on the inner side with the bias force exerted by the coil spring 34. Due to a friction force between the clip members and the drive shaft sleeve 10, the first and second clip members 31, 32 rotate together with the drive shaft sleeve 10. In this manner, the coil spring 34 biases the first and second clip members 31, 32 such that a clamping force exerted by the first and second clip members 31, 32 against the drive shaft sleeve 10 is increased.

The inner periphery of the first clip member 31 may have a first contact portion 36a and a second contact portion 36b formed thereon. The inner periphery of the second clip member 32 may have a third contact portion 36c formed thereon. The first, second and third contact portions 36a-36c are configured to contact with the outer periphery of the drive shaft sleeve 10. The first, second and third contact portions 36a-36c may be disposed at an angular interval of about 120 degrees with respect to the central axis O. With the first, second and third contact portions 36a-36c formed on the first and second clip members 31, 32, it is possible to concentrate the clamping force exerted by the first and second clip members 31, 32 against the drive shaft sleeve 10 onto the first, second and third contact portions 36a-36c. In this way, it is possible to increase the force acting on the drive shaft sleeve 10 without increasing the size of the cam 30.

Moreover, the protrusion 37 may be formed on the outer periphery of the first clip member 31 at a substantially midpoint between the other end and the connecting pin 33. The protrusion 37 is formed on the outer periphery of the first clip member 31 at a position where the protrusion 37 is engageable in the holding groove 26 of the anti-reverse pawl 20. With the protrusion 37, it is possible to control the switching of the anti-reverse pawl 20.

According to the embodiment, since the pair of clip members 31, 32 and the coil spring 34 coupling the clip members, which both are the components of the cam 30, are housed in the cylinder portion 2b formed in the front portion of the reel body 2, it is possible to protect the cam 30 from physical shocks, water, foreign substances and the like. Moreover, since the outer diameter of the cam 30 is smaller than the outer diameter of the bearing 10b attached to the cylinder portion 2b, it is possible to assemble the cam 30 from the outer side of the bearing 10b and therefore the assembly efficiency can be increased. Furthermore, it is possible to reduce the space to house the cam 30, resulting in a smaller-sized reel 1.

Mechanism of the anti-reverse device will be now described.

Reverse-Rotation Allowed State

FIG. 4 illustrates arrangements of the components when the switch lever is set to the reverse-rotation allowed state of the rotor 3. When the switch lever is set to the reverse-rotation allowed state, the function piece 50 pivots in the clockwise direction and presses the operated portion 25 of the anti-reverse pawl 20 down in the counterclockwise direction. Accordingly, the anti-reverse pawl 20 turns in the anti-clockwise direction, and the stopper portion 24 moves away from the trajectory of the teeth of the anti-reverse gear 12. Moreover, the operated portion 25 is sandwiched between the cylinder portion 2b and the function piece 50 and thereby the rotation of the anti-reverse gear 12 is restricted. In this manner, the stopper portion 24 is maintained away from the trajectory of the teeth of the anti-reverse gear 12.

Reverse-Rotation Inhibited State

Figure 5:
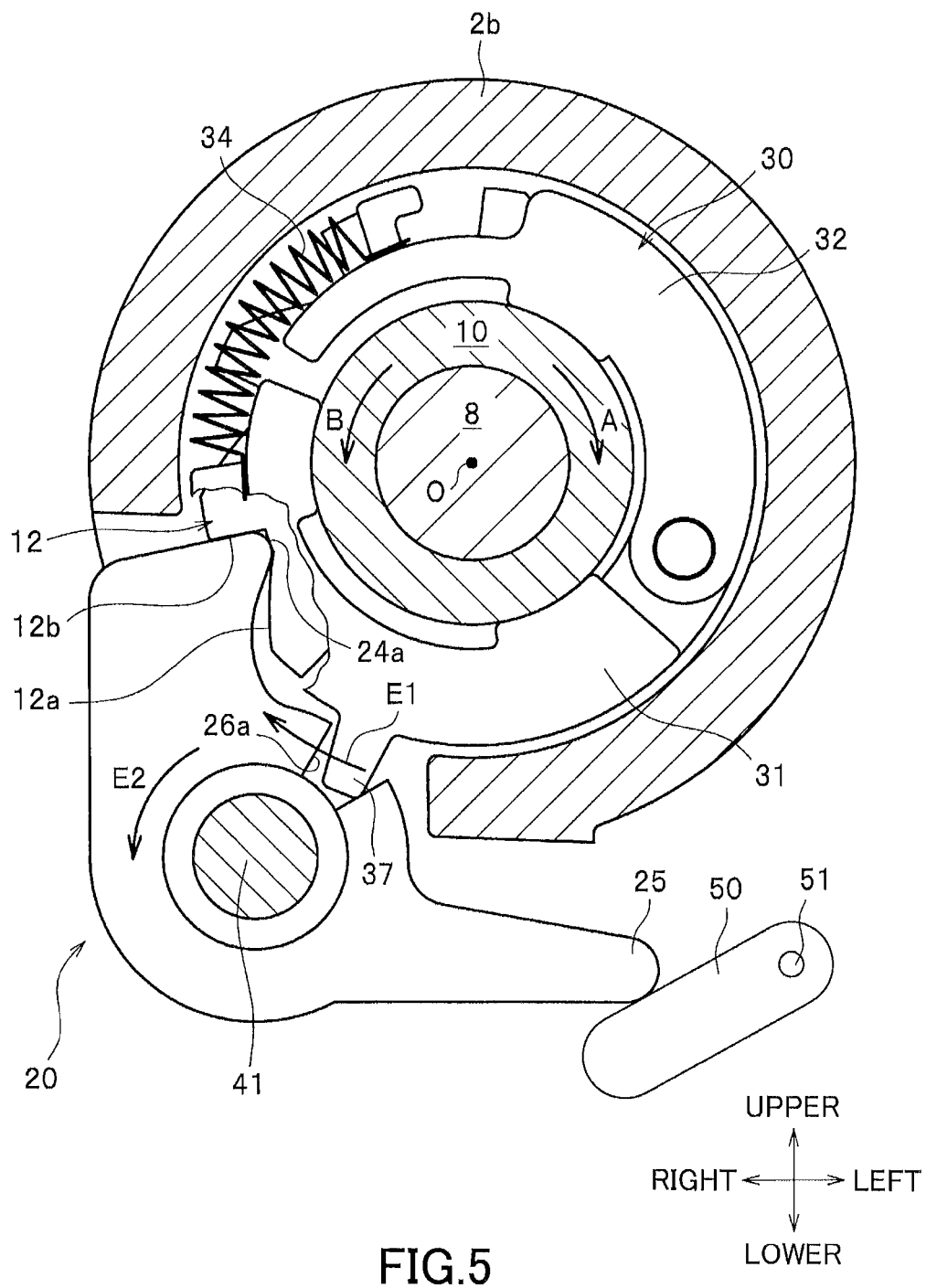
FIG. 5 schematically illustrates the anti-reverse device in a reverse-rotation inhibited state according to an embodiment of the disclosure.

Referring to FIG. 5, when the switch lever (not shown) is set to the reverse-rotation inhibited state of the rotor 3, the function piece 50 pivots in the counterclockwise direction. Accordingly, the operated portion 25 does not engage with the function piece 50 and the anti-reverse pawl 20 becomes turnable.

Reverse-Rotation Inhibited State to Forward Rotation

When the rotor 3 is in the reverse-rotation inhibited state as illustrated in FIG. 5 and rotates in the backward direction in accordance with release of the fishing line, the drive shaft sleeve 10 and the cam 30 also rotates in the counterclockwise direction (backward direction) and the protrusion 37 of the cam 30 pushes the second surface 26b of the holding groove 26. At this point, the protrusion 37 receives, from the second surface 26b, a reactive force of the (clockwise) direction which is opposite to the engagement direction (pushed direction). Therefore, the load acts on the first clip member 31 (the point of action) on which the protrusion 37 is provided (the point where the force is applied) in the direction in which the clip member closes toward the drive shaft sleeve 10, and consequently the friction force between the drive shaft sleeve 10 and the first clip member 31 increases. As a result, the cam 30 co-rotates with the drive shaft sleeve 10 without idling although it receives the reactive force from the anti-reverse pawl 20.

The anti-reverse pawl 20 pushed by the cam 30 then turns in the clockwise direction and the tip portion 24a of the anti-reverse pawl 20 enters into the trajectory of the teeth of the anti-reverse gear 12. Consequently, even when the rotor 3 tries to rotate further in the backward direction, the tip end portion 24a of the anti-reverse pawl 20 engages with the wall 12b of the anti-reverse gear 12 as shown in FIG. 5, thereby the backward rotations of the drive shaft sleeve 10 and the rotor 3 are inhibited.

Reverse-Rotation Inhibited State to Forward Rotation

When the drive shaft sleeve 10 rotates in the clockwise direction (the forward direction) by the winding operation of the handle under the reverse-rotation inhibited state, the tip end portion 24a of the anti-reverse pawl 20 slides up the sloop 12a and passes over the teeth of the anti-reverse gear 12. Therefore the rotation of the drive shaft sleeve 10 is not stopped and the forward rotation of the rotor 3 is allowed.

The cam 30 attached to the drive shaft sleeve 10 also turns in the clockwise direction in accordance with the forward rotation of the drive shaft sleeve 10. Accordingly, the protrusion 37 of the cam 30 pushes the right-side surface 26a of the holding groove 26 (see the arrow E1 in FIG. 5) and the anti-reverse pawl 20 is turned in the counterclockwise direction (see the arrow E2 in FIG. 5).

Figure 6:
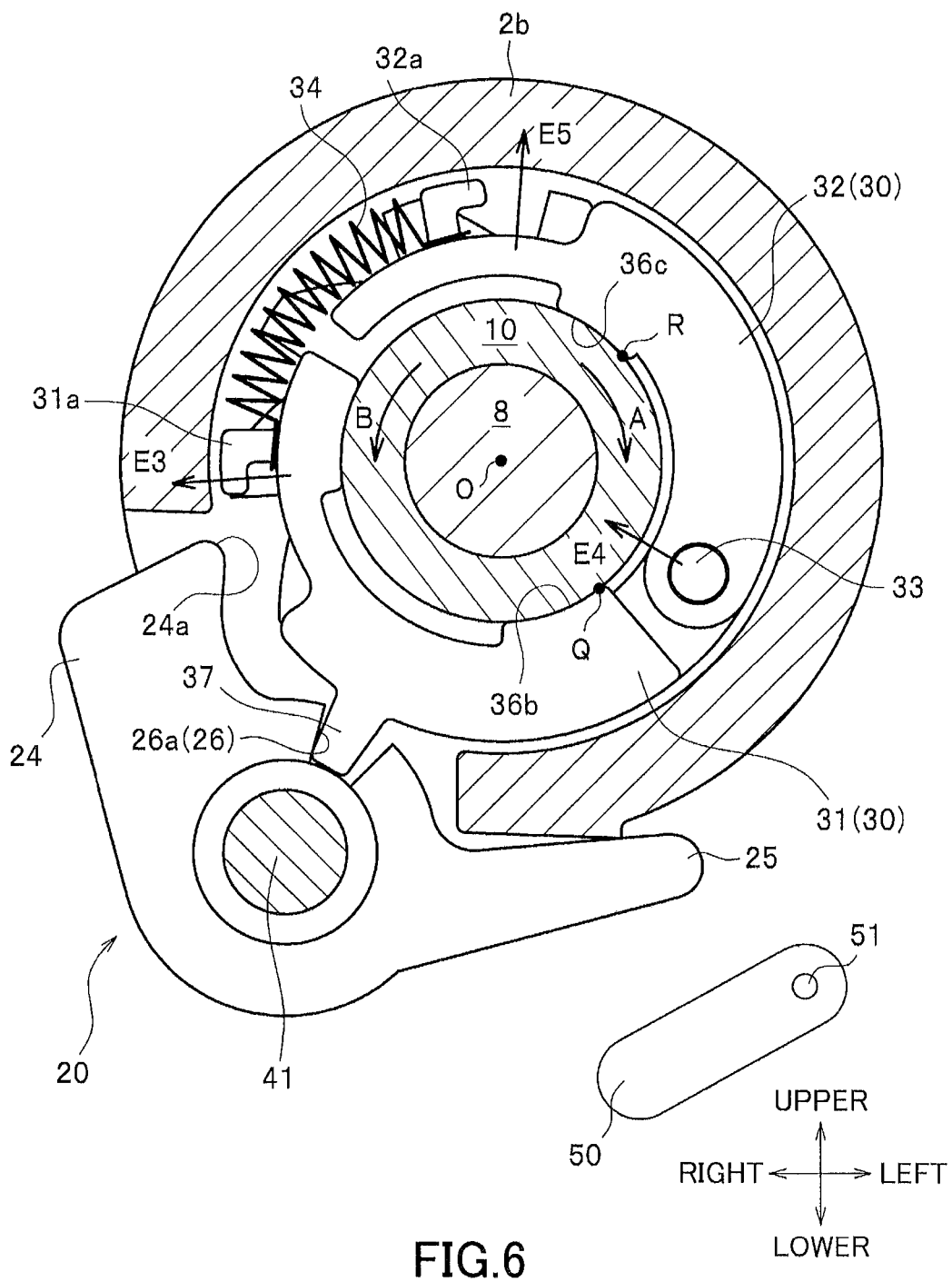
FIG. 6 is a sectional view of the anti-reverse device when a drive shaft sleeve rotates in a forward direction from the state shown in FIG. 5.

Consequently, as illustrated in FIG. 6, the tip portion 24a moves away from the trajectory of the tooth of the anti-reverse gear 12 and thereby it is possible to prevent the contact sound from being made by the contact between the anti-reverse pawl 20 and the anti-reverse gear 12.

Moreover, when the tip portion 24a moves away from the trajectory of the tooth of the anti-reverse gear 12, the operated portion 25 contacts with the peripheral surface of the cylinder portion 2b which restricts the turn of the anti-reverse pawl 20 in the counterclockwise direction.

Figure 7:
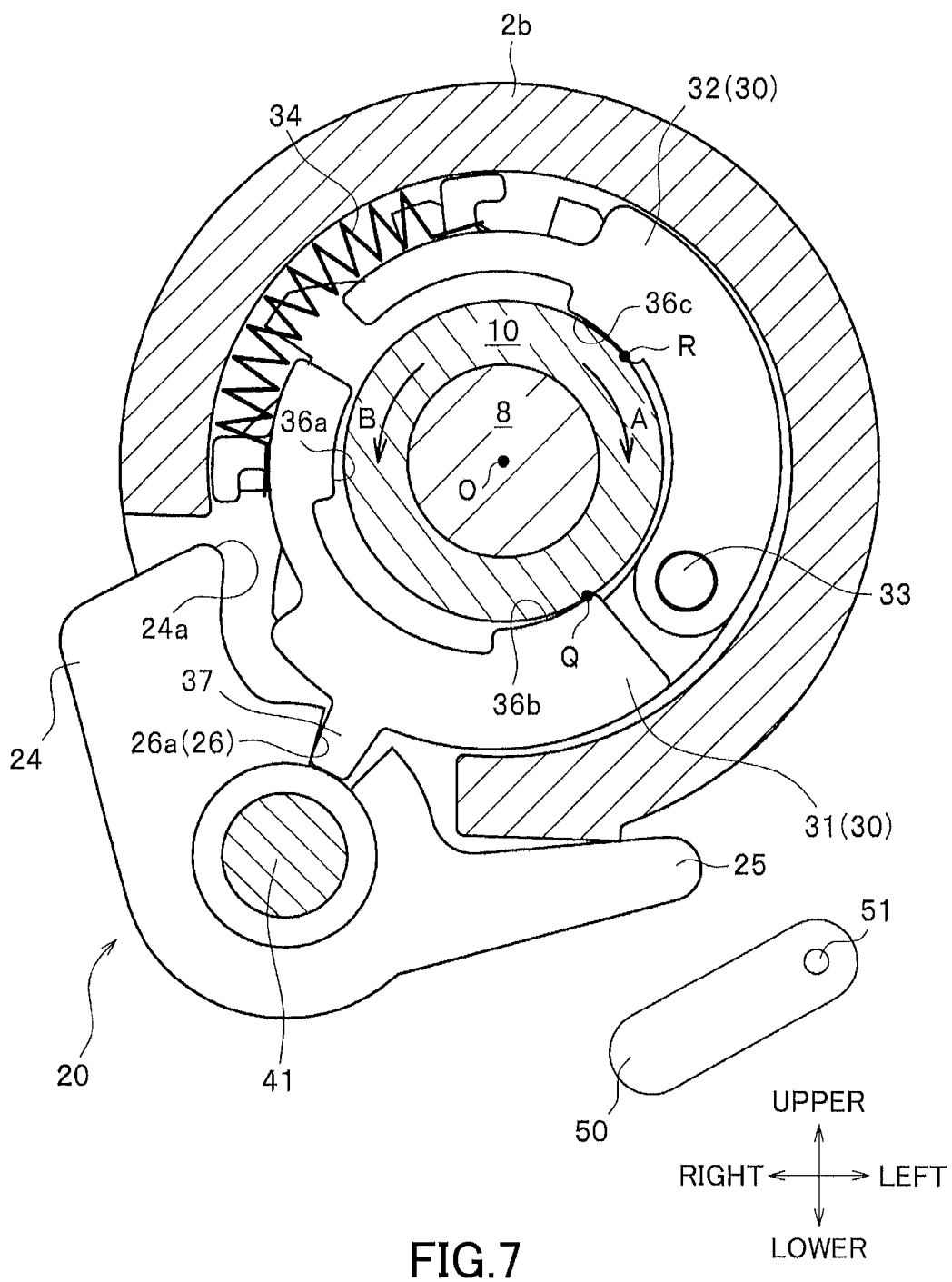
FIG. 7 is a sectional view of the anti-reverse device when the drive shaft sleeve rotates further in the forward direction from the state shown in FIG. 6.
Figure 8:
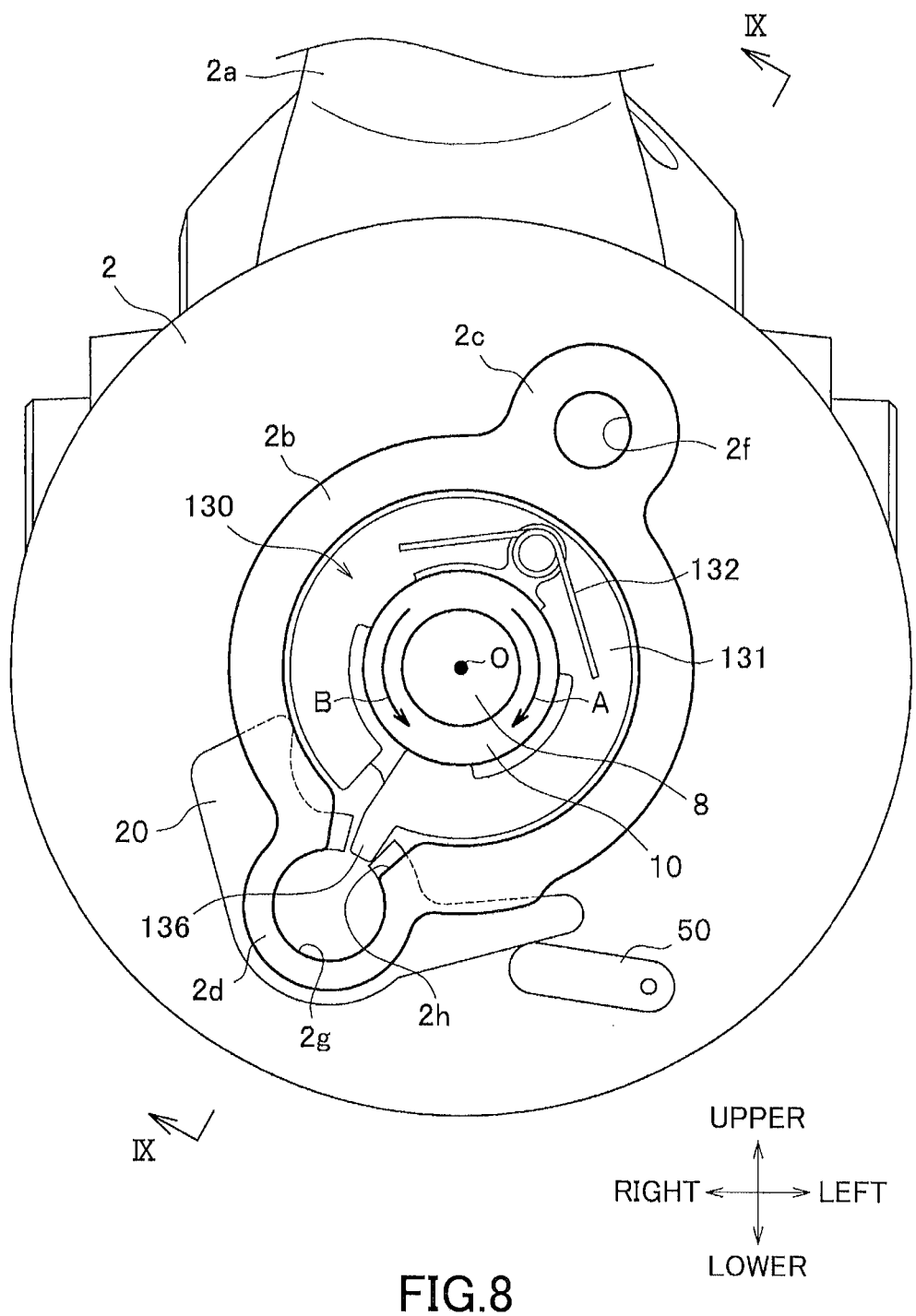
FIG. 8 is an elevation view of an anti-reverse device according to other embodiment when viewed from the front of the reel body.

In the state illustrated in FIG. 6, when the cam 30 further rotates in the forward direction, the protrusion 37 of the cam 30 receives, from the first surface 26a, the reactive force of the opposite direction (the counterclockwise direction) to the engagement direction (pushed direction). Accordingly, the first clip member 31 (the point of action) on which the protrusion 37 is provided (the point where the force is applied) is tilted (see the arrow E3 in FIG. 6) such that the other end of the first clip member 31 moves toward the anti-reverse pawl 20 (the radially outward of the drive shaft sleeve 10) with a fulcrum point of the contact point Q between the one end of the second contact portion 36b and the drive shaft sleeve 10. Consequently, the first contact portion 36a of the first clip member 31 does not contact the drive shaft sleeve 10 as illustrated in FIG. 7, and the other ends of the pair of the clip members 31, 32 are opened. In order to clearly illustrate the gap, the gap is shown relatively large in FIG. 7. However, in practice, the gap is created to have a very small distance from the peripheral surface of the drive shaft sleeve 10.

More specifically, as illustrated in FIG. 6, since the first clip member 31 tilts with the contact point Q as a fulcrum, the connecting pin 33 of the first clip member 31 is situated adjacent to the peripheral surface of the drive shaft sleeve 10 (see the arrow E4 in FIG. 6) and the one end of the second clip member 32 coupled to the connecting pin 33 is also situated adjacent to the peripheral surface of the drive shaft sleeve 10. As a result, the second clip member 32 is tilted (see the arrow E5 in FIG. 6) such that the other end of the second clip member 32 moves away from the drive shaft sleeve 10 with a fulcrum point of the contact point R between the one end of the third contact portion 36c and the drive shaft sleeve 10.

Accordingly, as shown in FIG. 7, the other end of the second clip member 32 moves away from the drive shaft sleeve 10 and the other ends of the pair of the clip members 31, 32 are further opened, and the cam 30 slides on the rotating drive shaft sleeve 10 only at the contact points Q, R. Therefore the friction force between the first and second clip members 31, 32 and the drive shaft sleeve 10 is decreased, realizing the smooth forward rotation of the drive shaft sleeve 10.

The behavior of the anti-reverse device at the time when the rotor 3 rotates in the forward and backward directions in the reverse-rotation inhibited state has been described. Behavior of the anti-reverse device at the time when the rotor 3 rotates in the forward and backward direction in the reverse-rotation allowed state will be now described.

Reverse-Rotation Allowed State to Forward Rotation

Referring to FIG. 4, the stopper portion 24 is situated away from the trajectory of the teeth of the anti-reverse gear 12 in the reverse-rotation allowed state as described above. Therefore, when the drive shaft sleeve 10 and the cam 30 rotate in the forward direction by the handle operation, the protrusion 37 receives, from the first surface 26a of the holding groove 26, the reactive force in the opposite direction to the engagement direction (pushed direction) and the other ends of the pair of clip members 31, 32 are opened. Accordingly the cam contacts the drive shaft sleeve 10 only at the contact points Q, R (see FIG. 7). Therefore the friction force between the first and second clip members 31, 32 and the drive shaft sleeve 10 is decreased, realizing the smooth rotation of the drive shaft sleeve 10.

Reverse-Rotation Allowed State to Backward Rotation

On the contrary, when the drive shaft sleeve 10 rotates in the counterclockwise direction (backward direction), the protrusion 37 receives, from the second surface 26b of the holding groove 26, the reactive force of the direction opposite to the engagement direction (pushed direction). Accordingly a load acts on the first and second clip members 31, 32 in the direction in which the clip members are closed. Therefore, all of the first to third contact portions 36a to 36c of the cam 30 contact the drive shaft sleeve 10. Consequently, the friction force between the cam 30 and the drive shaft sleeve 10 increases, which puts a brake on the backward rotation of the drive shaft sleeve 10.

An anti-reverse device according to other embodiments of the disclosure will be now described with reference to FIGS. 8 to 18d. The anti-reverse device may include the anti-reverse gear 12, the anti-reverse pawl 20, and the cam 130 as shown in FIGS. 8 to 18d. The anti-reverse device can be applied to other fishing reels that have the same configuration as those of the reel 1 shown in FIG. 1 except for the specific structures of the anti-reverse device. The reference numerals used in the anti-reverse device shown in FIGS. 2 to 7 will be given to the corresponding components of the anti-reverse device shown in FIGS. 8 to 18d and those description will be hereunder omitted.

Figure 9:
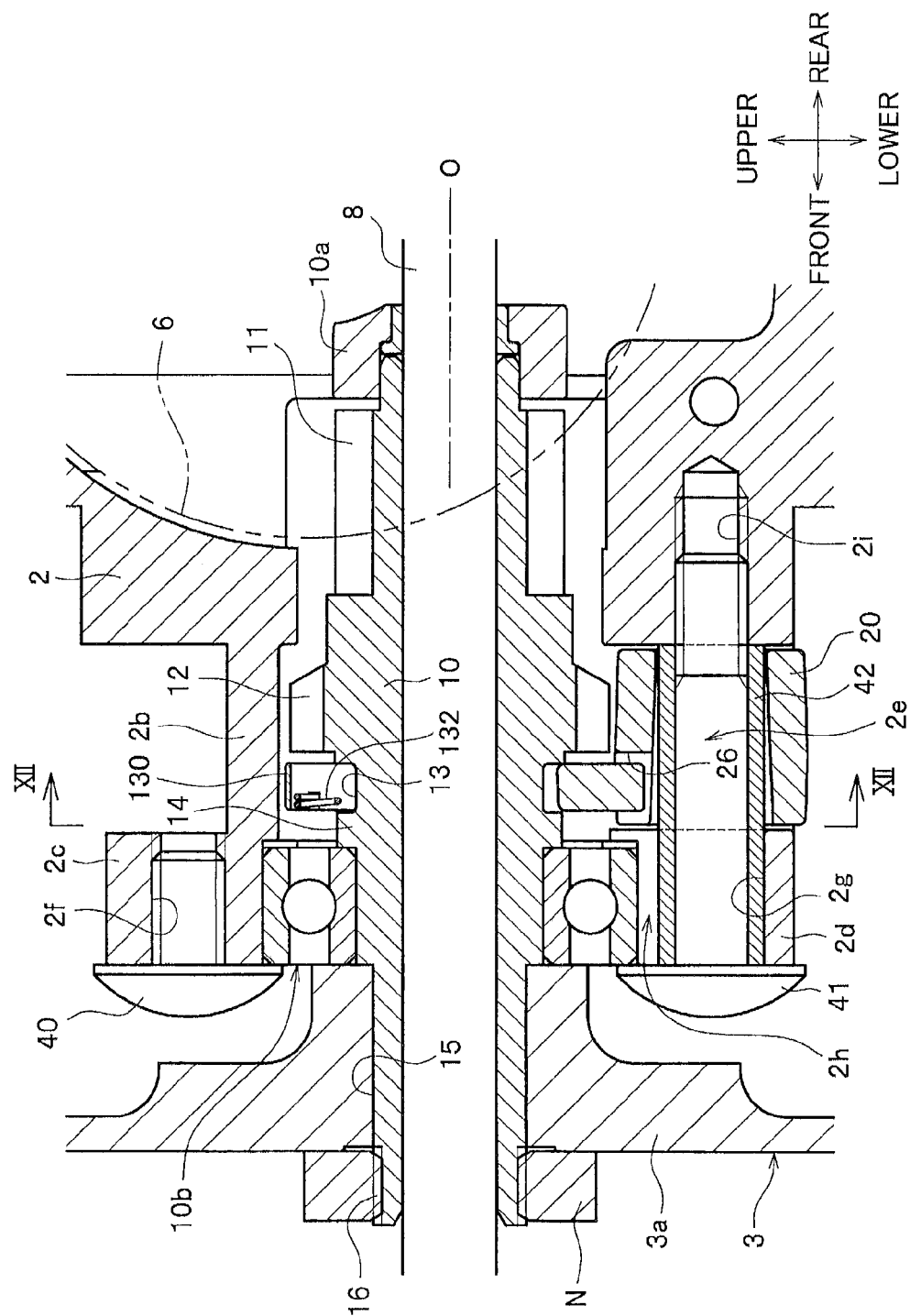
FIG. 9 is a sectional view along the line IX-IX of FIG. 8.

Referring to FIG. 9, a screw hole 2i may be formed on a line extended from a through-hole 2g of the reel body 2, and the screw 41 penetrates the through-hole 2g to be screwed into the screw hole 2i to be fixed therein. A cylindrical member 42 may be attached to the outer surface of the screw 41. The cylindrical member 42 can freely pivot on the screw 41.

The screw 41 and the cylindrical member 42 may extend in the front-rear direction within the boss 2d and the opening 2e, and the anti-reverse pawl 20 is also disposed therein.

Figure 10:
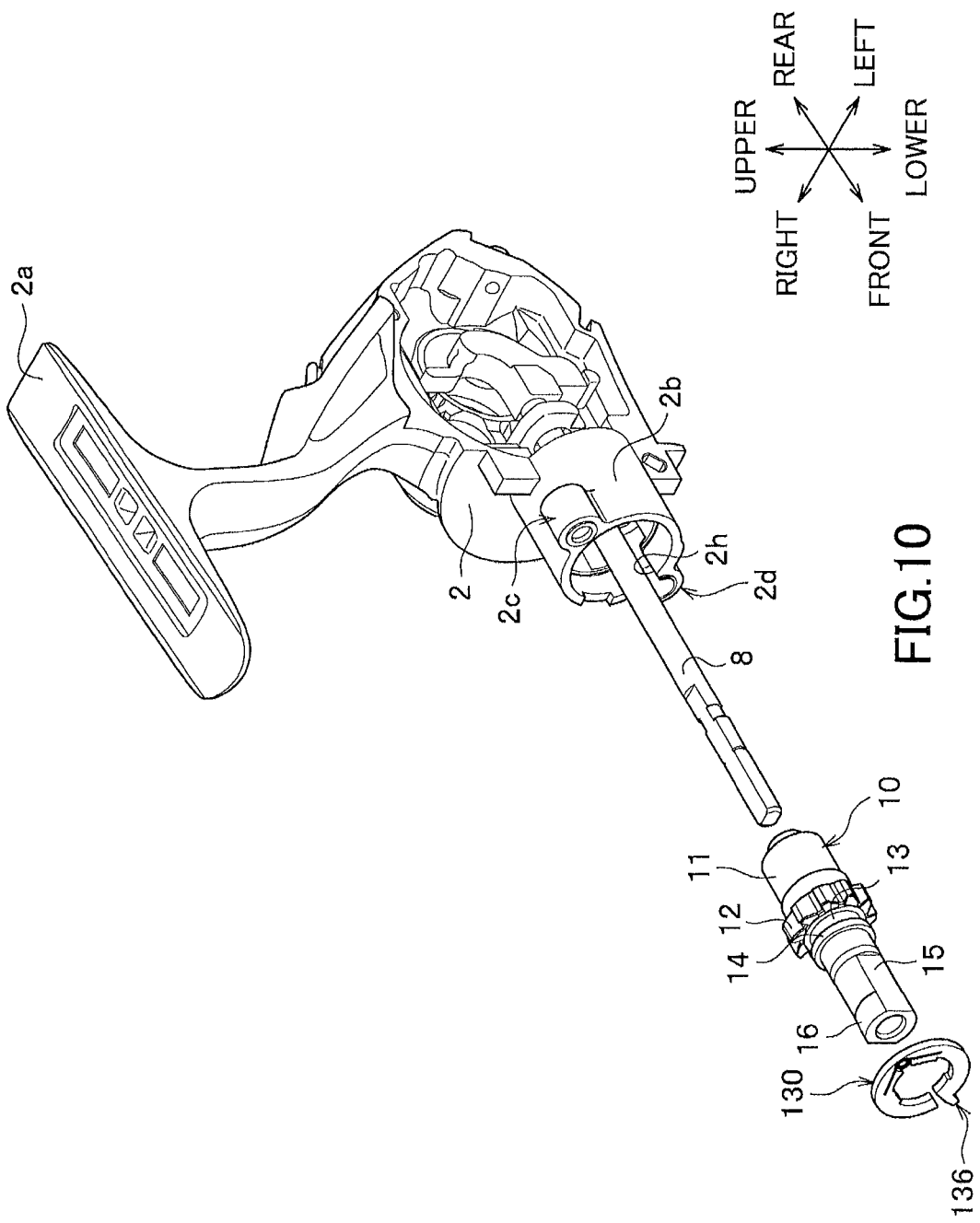
FIG. 10 is an exploded perspective view of an anti-reverse device according to another embodiment in which a reel body, a drive shaft sleeve, and a cam are shown as disassembled.

Referring to FIG. 28 and FIG. 10, a notched groove 2h that connects the inside of the cylinder portion 2b with the inside of the through-hole 2g may be formed in the boss 2d. The notched groove 2h is provided for letting a protrusion 36 of the cam 130 inserted therethrough when the cam 130 is housed within the cylinder portion 2b. The notched groove 2h may extend from the front edge of the cylinder portion 2b to the opening 2e.

The anti-reverse device according to the embodiment will be now described. The anti-reverse device may include the anti-reverse gear 12, the anti-reverse pawl 20, and the cam 130.

The anti-reverse gear 12 in the anti-reverse device according to the embodiment is configured and arranged in the same manner as the anti-reverse gear 12 of the above embodiment described with reference to FIGS. 2 to 7. The anti-reverse pawl 20 according to the present embodiment may be disposed in the opening 2e of the cylindrical portion 2b to face the anti-reverse gear 12 and the cam 130 within the cylindrical portion 2b. The anti-reverse pawl 20 may be attached to the cylindrical member 42 and fixed thereon so as to not come off but be able to pivot on the screw 41.

Figure 11:
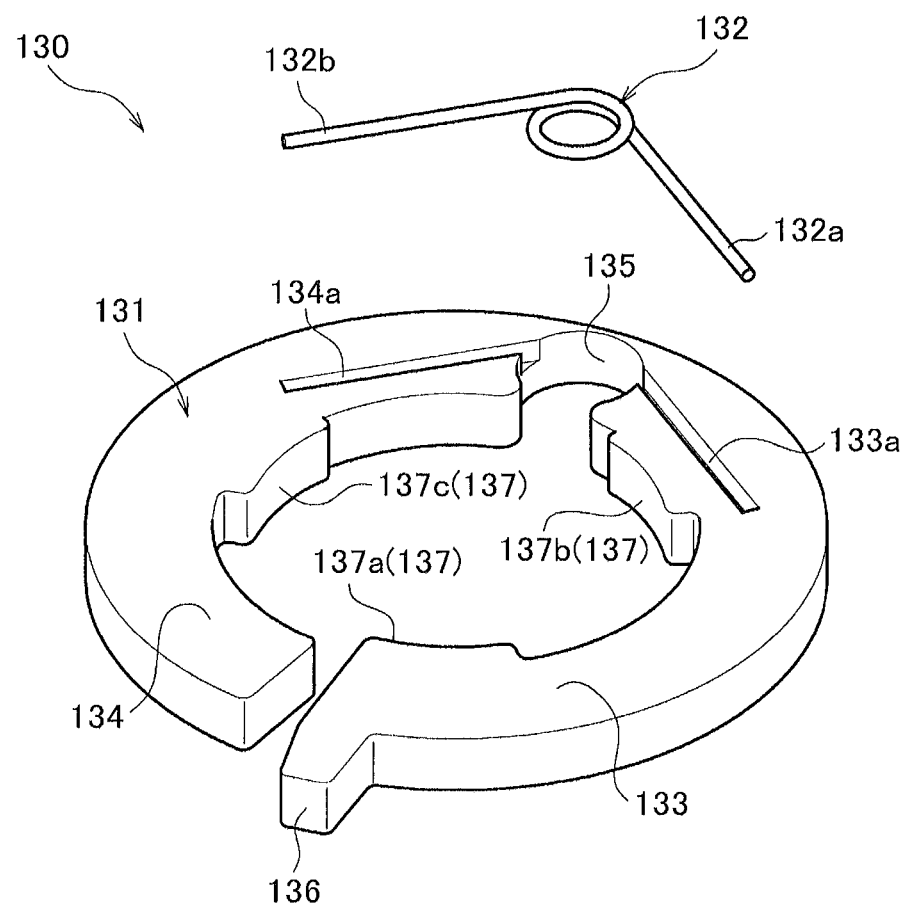
FIG. 11 is an exploded perspective view of the cam.

The cam 130 according to the embodiment illustrated in FIGS. 8 to 18d will be now described. In the same manner as the cam 30, the cam 130 is a component which controls the pivoting of the anti-reverse pawl 20 (or raises the anti-reverse pawl 20) when the drive shaft sleeve 10 rotates in the forward direction. Referring to FIG. 11, the cam 130 may be attached to the drive shaft sleeve (rotator) 10 and include a friction clip 131 that rotates together with the drive shaft sleeve 10 due to the friction force between the friction clip 131 and the drive shaft sleeve 10, and a torsion spring (bias member) 132 that biases the friction clip 131 such that a clamping force by the friction clip 131 is increased.

The friction clip 131 may include two clip members 133, 134 clipping the drive shaft sleeve 10, a connecting portion 135 connecting the two clip members 133, 134 openable and closable, and a protrusion (engaging portion) 136 protruding radially outward from one of the clip members 133, 134 to be engaged with the anti-reverse pawl 20. The friction clip 131 may have a single body made of resin by molding and each member or portion (the two clip members 133, 134, the connecting portion 135, and the protrusion 136) of the clip 131 cannot be separated therefrom.

Figure 12:
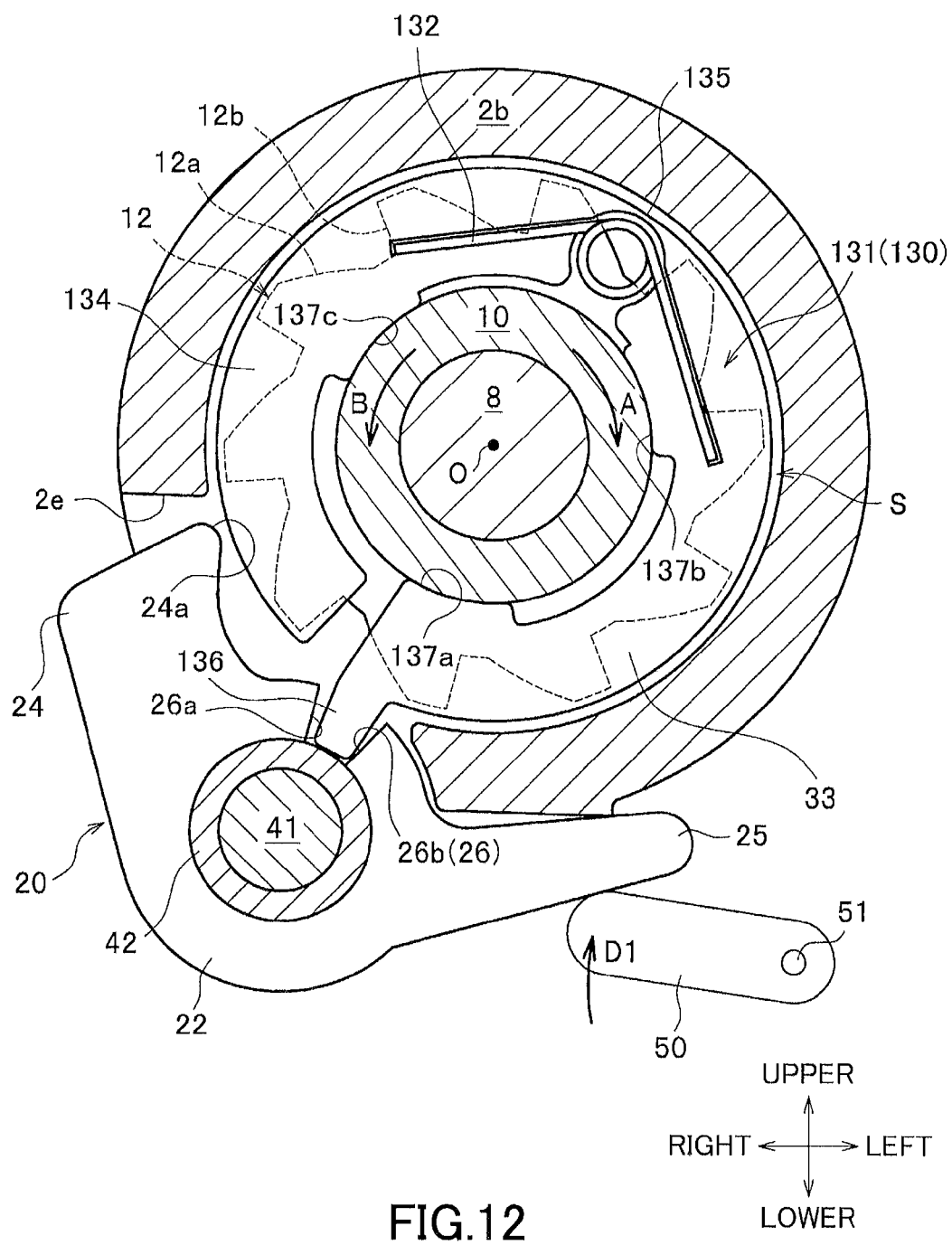
FIG. 12 is a sectional view along the line XII-XII of FIG. 9 illustrating the anti-reverse device in which a switch lever is set to a reverse-rotation allowed state.

Each of the two clip members 133, 134 may be formed in a substantially C-shape as viewed from the front and the inner periphery (contact portion 137) of the members may contacts the outer periphery of the drive shaft sleeve 10 (see FIG. 12). One of the two clip members 133, 134 that is situated in the forward direction with respect to the connecting portion 135 may be referred to as a first clip member 133, and the other that is situated in the backward direction with respect to the connecting portion 135 may be referred to as a second clip member 134.

Engagement grooves 133a, 134a for receiving ends 132a, 132b of the torsion spring 132 may be provided in a base portion of the first and second clip members 133, 134. The torsion spring 132 may be placed in the engagement grooves 133a, 134a such that the torsion spring is spread wider than the point of no-load. In this way, the first and second clip members 133, 134 are biased all the time to a direction in which clamping of the first and second clip members 133, 134 is increased and consequently the friction force may be generated by the first and second clip members 133, 134 against the drive shaft sleeve 10.

The first and second clip members 133, 134 may have three contact portions 137 (first to third contact portions 137a-137c) protruding radially inward from the inner periphery of the clip to contact the drive shaft sleeve 10. With the contact portions 137, an contact area between the first and second clip members 133, 134 and the drive shaft sleeve 10 is decreased, and the clamping force exerted by the first and second clip members 133, 134 is concentrated on the contact portions 137 (first to third contact portions 137a-137c). In other words, the clamping force can be increased without increasing the size of the cam 130.

Referring to FIG. 12, the first contact portion 137a may be situated at a tip end portion of the first clip member 133. The second contact portion 137b may be situated at a base end portion of the first clip member 133. The third contact portion 137c may be situated at a substantially middle portion of the second clip member 134. In other words, the first to third contact portions 137a-137c are disposed circumferentially at a substantially equal interval so that it is possible to stably clip the drive shaft sleeve 10 by the friction clip 131.

The connecting portion 135 may extend circumferentially between the base end portion of the first clip member 133 and the base end portion of the second clip member 134 and may have a thin strip shape to have flexibility. The outer peripheral surface formed by the connecting portion 135, the first and second clip members 133, 134 have an arc-like shape to prevent the clip from catching the inner peripheral surface of the cylindrical portion 2*b*.

The protrusion 136 of the embodiment may be provided on the outer peripheral surface of the first clip member 133 at the tip end portion. The protrusion 136 may be engaged in the holding groove 26 of the anti-reverse pawl 20 and transmit the rotational motion of the cam 130 to the anti-reverse pawl 20. The protrusion 136 may be situated (protrude out) within the opening 2*e* to engage in the holding groove 26 of the anti-reverse pawl 20. When the cam 130 is housed in the cylindrical portion 2*b*, the protrusion 136 may be moved along the notched groove 2*h* (see FIG. 8) of the cylindrical portion 2*b* to be situated within the opening 2*e* as well as placing the cam 130 within the cylindrical portion 2*b*.

Referring again to FIG. 8, the diameter of the cam 130 (except the protrusion 136) may be made smaller than the outer diameter of the bearing 10*b* attached to the cylindrical portion 2*b* so that the cam 130 can be housed within the cylindrical portion 2*b*. Therefore the bearing 10*b* can be fitted to the cylindrical portion 2*b* from the outside after the drive shaft sleeve 10 and the cam 130 are placed within the cylindrical portion 2*b*. In this way, the assembly efficiency of the cam 130 and the bearing 10*b* is enhanced. Moreover, the friction clip 131 may be formed to have a clearance S with the inner peripheral surface of the cylindrical portion 2*b* as shown in FIG. 12. Therefore, the first and second clip members 133, 134 clamping the drive shaft sleeve 10 are openable within the cylindrical portion 2*b*.

Examples of the behaviors of the anti-reverse device will be now described.

Reverse-Allowed State

Referring to FIG. 12, when the switch lever (not shown) is set to the reverse-rotation allowed state of the rotor 3, the function piece 50 pivots in the clockwise direction (indicated by the arrow D1 in FIG. 12) and presses down the operated portion 25. Accordingly, the anti-reverse pawl 20 turns in the anti-clockwise direction and the stopper portion 24 moves away from the trajectory of the teeth of the anti-reverse gear 12. Moreover, the operated portion 25 is sandwiched between the cylinder portion 2*b* and the function piece 50 and thereby the rotation of the anti-reverse gear 12 is restricted. In this manner, the stopper portion 24 is maintained away from the trajectory of the teeth of the anti-reverse gear 12.

Reverse-Rotation Inhibited State

Figure 13:
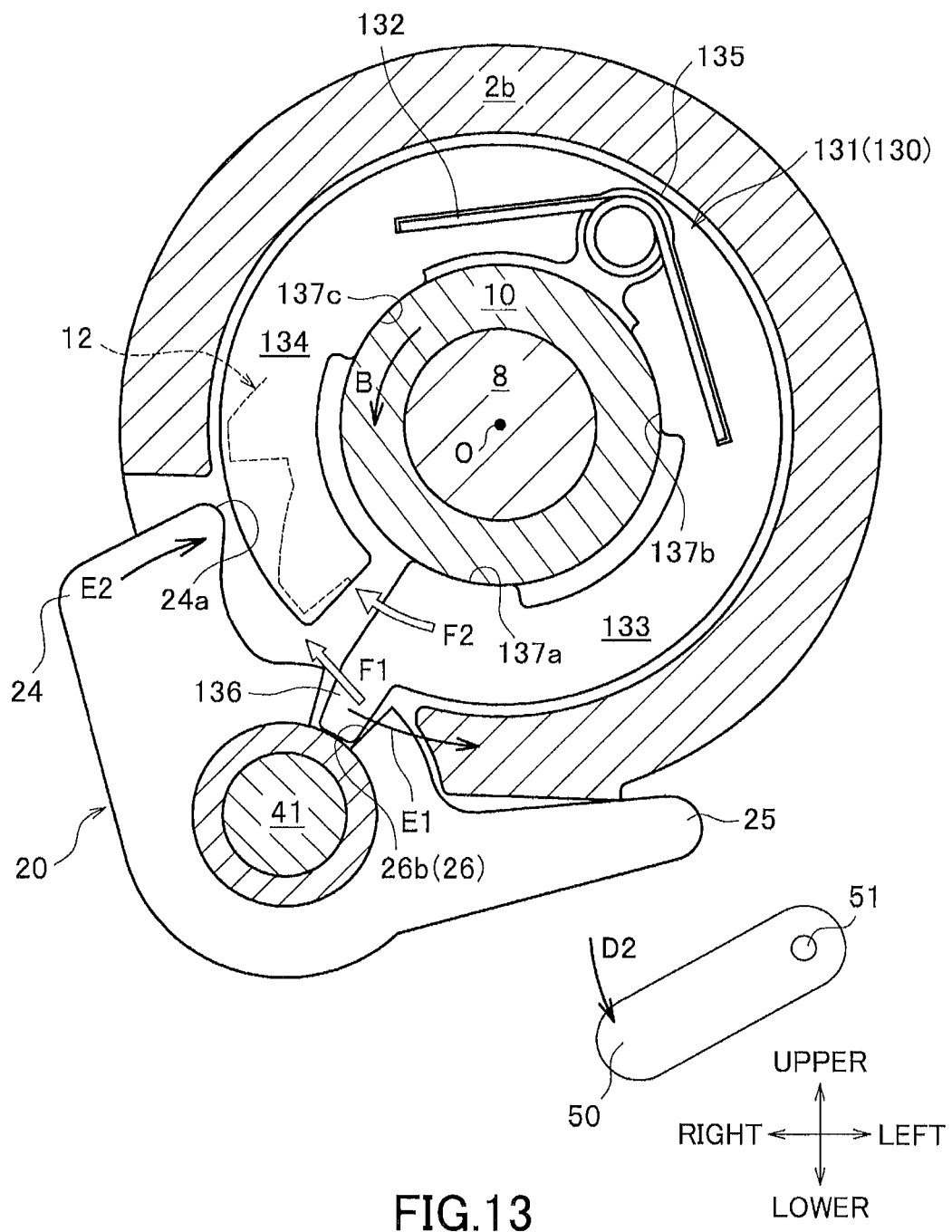
FIG. 13 is a sectional view of the anti-reverse device in which the switch lever is set to a reverse-rotation inhibited state from the state shown in FIG. 12.

Referring to FIG. 13, when the switch lever (not shown) is set to the reverse-rotation inhibited state of the rotor 3, the function piece 50 pivots in the counter-clockwise direction (indicated by the arrow D2 in FIG. 13). Accordingly, the operated portion 25 does not engage with the function piece 50 and the anti-reverse pawl 20 becomes turnable.

Reverse-Rotation Inhibited State to Forward Rotation

When the rotor 3 rotates in the backward direction as the fishing line is released, the drive shaft sleeve 10 and the cam 130 also rotate in the backward direction (see the arrow B) and the protrusion 136 of the cam 130 pushes the second surface 26*b* of the holding groove 26 (see the arrow E1 in FIG. 13).

At this point, the protrusion 136 receives, from the second surface 26*b*, a reactive force of the direction (indicated by the arrow F1 in FIG. 13) which is opposite to the engagement direction (pushed direction). Therefore, the load acts on the first clip member 133 (the point of action) on which the protrusion 136 is provided (the point where the force is applied) in the direction in which the clip member closes with a fulcrum point of the connecting portion 35, and consequently the friction force between the drive shaft sleeve 10 and the first clip member 133 increases. As a result, the cam 130 co-rotates with the drive shaft sleeve 10 without idling although it receives the reactive force from the anti-reverse pawl 20.

Figure 14:
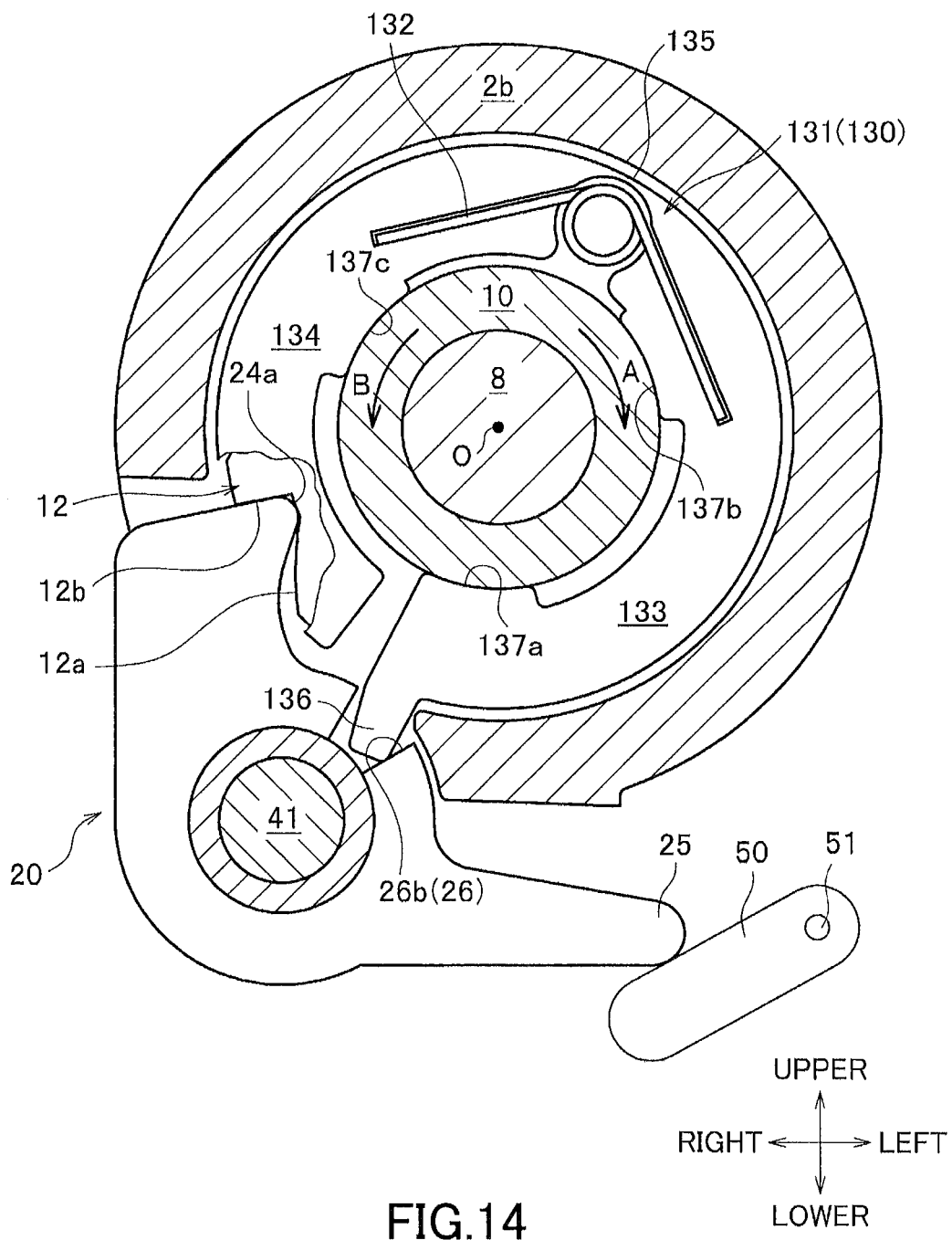
FIG. 14 is a sectional view of the anti-reverse device in which the anti-reverse gear is engaged with the anti-reverse pawl when the drive shaft sleeve rotates in the backward direction from the state shown in FIG. 13.

The anti-reverse pawl 20 pushed by the cam 130 then turns in the clockwise direction and the tip end portion 24*a* of the anti-reverse pawl 20 enters into the trajectory of the teeth of the anti-reverse gear 12 (see the arrow E2 in FIG. 13). Consequently, even when the rotor 3 tries to rotate further in the backward direction, the tip portion 24*a* of the anti-reverse pawl 20 engages with the wall 12*b* of the anti-reverse gear 12 as shown in FIG. 14, thereby the backward rotations of the drive shaft sleeve 10 and the rotor 3 are inhibited.

Reverse-Rotation Inhibited State to Forward Rotation

When the drive shaft sleeve 10 rotates in the forward direction (indicated by the arrow A) by the winding operation of the handle under the reverse-rotation inhibited state, the tip portion 24*a* of the anti-reverse pawl 20 slides up the sloop 12*a* and passes over the teeth of the anti-reverse gear 12. Therefore the rotation of the drive shaft sleeve 10 is not hampered and the forward rotation of the rotor 3 is allowed.

Figure 15:
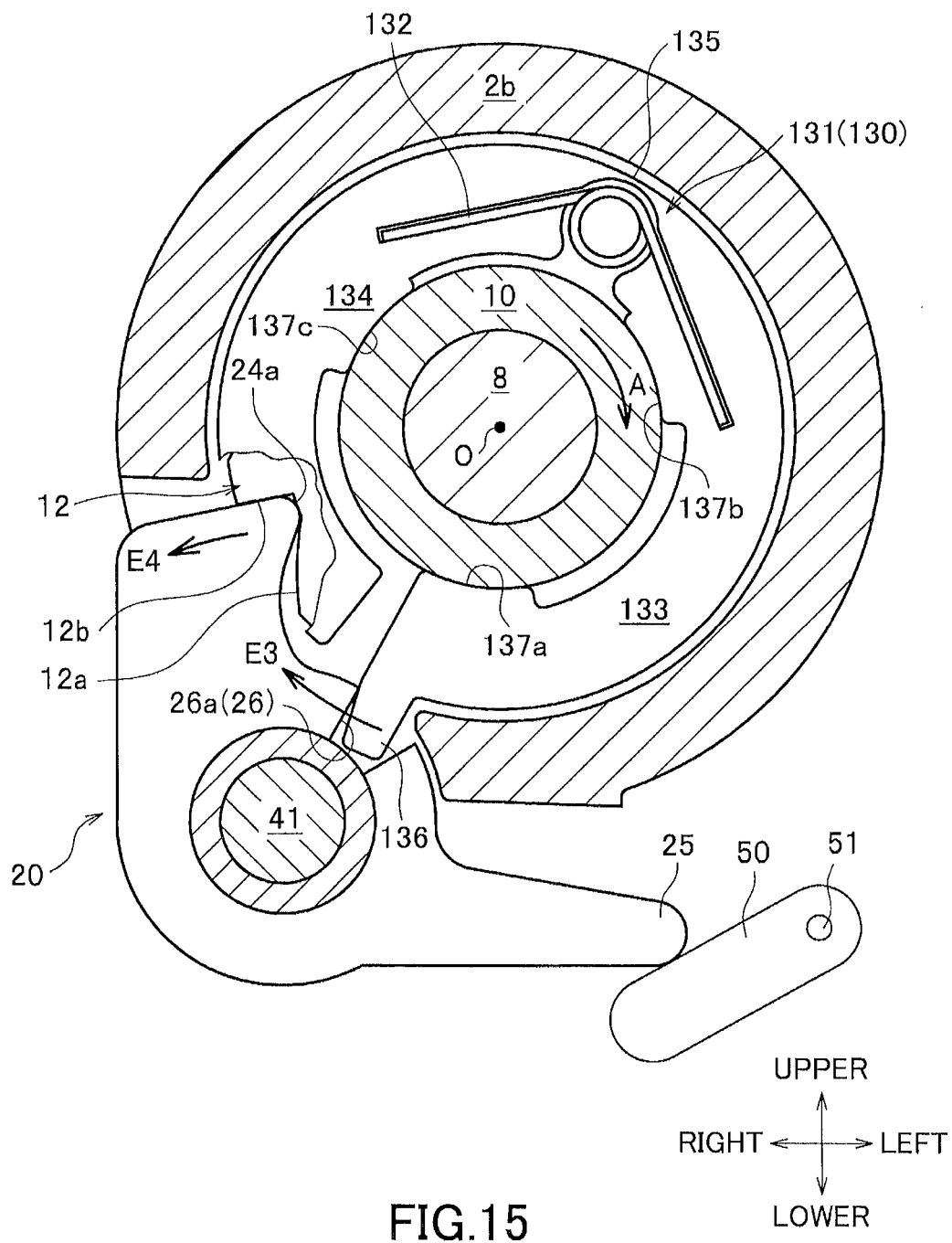
FIG. 15 is a sectional view of the anti-reverse device when the drive shaft sleeve rotates in the forward direction from the state shown in FIG. 14.
Figure 16:
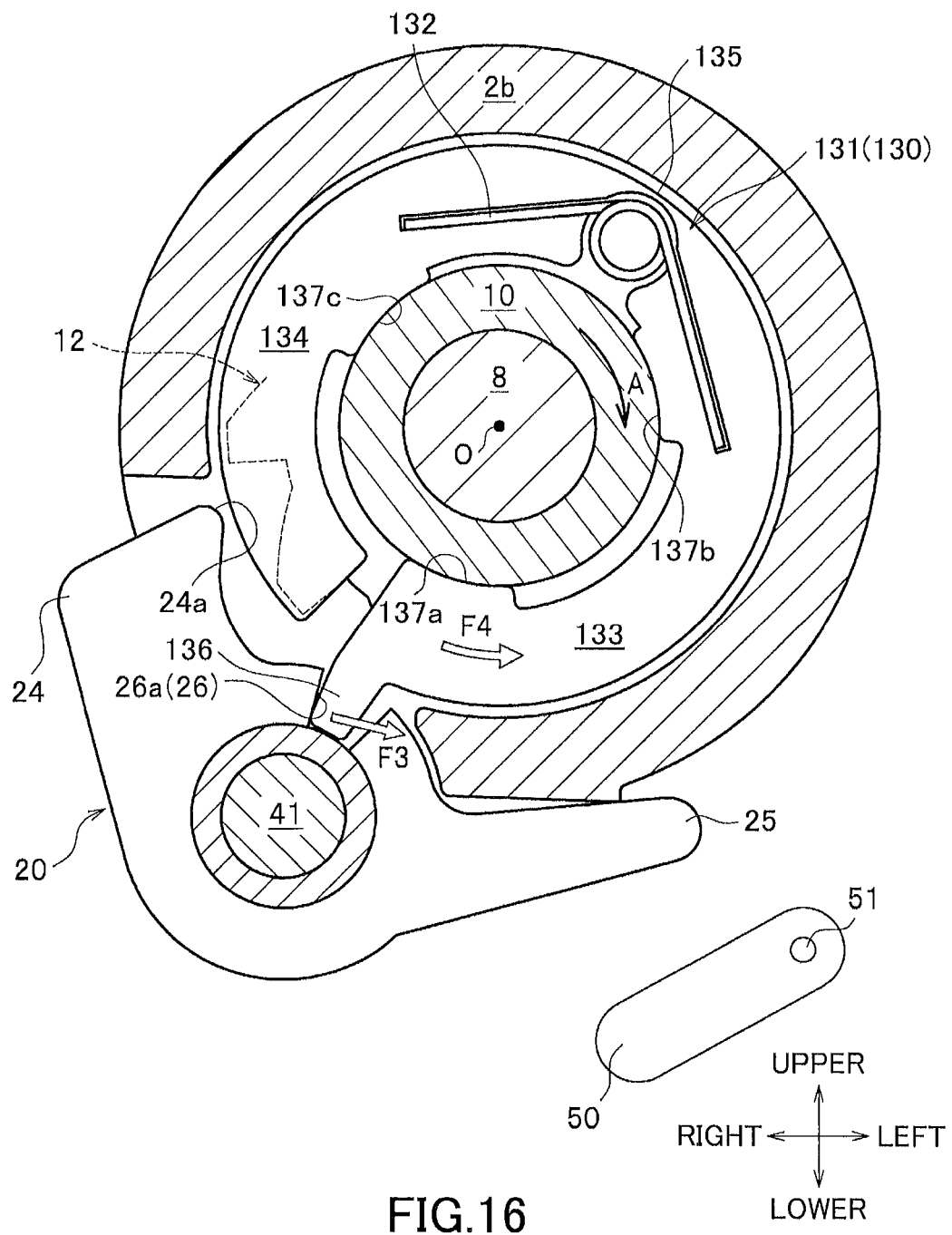
FIG. 16 is a sectional view of the anti-reverse device in which the engagement of the anti-reverse gear with the anti-reverse pawl is released when the drive shaft sleeve further rotates in the forward direction from the state shown in FIG. 15.

Furthermore, when the cam 130 rotates in the forward direction (see the arrow A) in accordance with the forward rotation of the drive shaft sleeve 10, the protrusion 136 of the cam 130 pushes the first surface 26*a* of the anti-reverse pawl 20 (see the arrow E3 in FIG. 15) and the anti-reverse pawl 20 pivots in the counterclockwise direction (indicated by the arrow E4 in FIG. 15). Consequently, as illustrated in FIG. 16, the tip portion 24*a* moves away from the trajectory of the tooth of the anti-reverse gear 12 and thereby it is possible to prevent the contact sound between the anti-reverse pawl 20 and the anti-reverse gear 12. Moreover, when the tip portion 24*a* moves away from the trajectory of the tooth of the anti-reverse gear 12, the operated portion 25 contacts with the peripheral surface of the cylinder portion 2*b* which restricts the turn of the anti-reverse pawl 20 in the counterclockwise direction.

In the state illustrated in FIG. 16, when the cam 130 further rotates in the forward direction, the protrusion 136 receives, from the first surface 26*a*, the reactive force of the opposite direction (indicated by the arrow F3 in FIG. 16) to the engagement direction (pushed direction). Therefore, the load acts on the first clip member 133 (the point of action) on which the protrusion 136 is provided (the point where the force is applied) in the direction in which the clip member opens with the fulcrum point of the connecting portion 35 (see the arrow F4 in FIG. 16). Therefore the friction force between the first clip member 133 and the drive shaft sleeve 10 is decreased, realizing the smooth forward rotation of the drive shaft sleeve 10.

When the load on the first clip member 133 is larger than the bias force generated by the torsion spring 132, the first clip member 133 moves to open against the bias force of the torsion spring 132 and consequently the first contact portion 137a and the second contact portion 137b do not contact the drive shaft sleeve 10 although this is not illustrated in the accompanied drawings.

The behavior of the anti-reverse device at the time when the rotor 3 rotates in the forward and backward direction in the reverse-rotation inhibited state has been described. Behavior of the anti-reverse device at the time when the rotor 3 rotates in the forward and backward direction in the reverse-rotation allowed state.

Reverse-Rotation Allowed State to Forward Rotation

Referring to FIG. 12, the stopper portion 24 is situated away from the trajectory of the teeth of the anti-reverse gear 12 in the reverse-rotation allowed state as described above. Therefore, when the drive shaft sleeve 10 and the cam 130 rotate in the forward direction (indicated by the arrow A) by the handle operation, the protrusion 136 receives, from the first surface 26a of the holding groove 26, the reactive force in the opposite direction to the engagement direction (pushed direction) and the load acts on the first clip member 133 (the point of action) in the direction in which the clip member opens with the fulcrum point of the connecting portion 135. Therefore the friction force between the first clip member 133 and the drive shaft sleeve 10 is decreased, realizing the smooth forward rotation of the drive shaft sleeve 10.

Reverse-Rotation Allowed State to Backward Rotation

When the drive shaft sleeve 10 and the cam 130 rotate in the forward direction (indicated by the arrow B) by the reverse-rotation of the rotor 3, the protrusion 136 receives, from the first surface 26a of the holding groove 26, the reactive force in the opposite direction to the engagement direction (pushed direction) and the load acts on the first clip member 133 in the direction in which the clip member closes. Consequently, the friction force between the cam 130 and the drive shaft sleeve 10 increases, which puts a brake on the backward rotation of the drive shaft sleeve 10. Therefore when the fishing-line is released by the reverse-rotation of the rotor 3 or the rotor 3 is rotated in the backward direction at the time of preparation of a tackle, it is possible to put a moderate brake on the reverse-rotation of the rotor 3 to prevent any trouble caused by unintended excessive rotation of the rotor 3.

The load acts on the first clip member 133 when the protrusion 136 engages in the holding groove 26 will be now described.

Referring to FIG. 12, since the protrusion 136 is situated at the tip end portion of the first clip member 133, the distance between the connecting portion 135 (the fulcrum point) and the protrusion 136 (the point where the force is applied) that receives the reactive force may be larger than the case where the protrusion 36 is formed in the base end portion of the first clip member 33. Accordingly, the load acts on the first clip member 133 (the point of action) is made larger. Therefore, it is possible to effectively increase the friction force between the first clip member 133 and the drive shaft sleeve 10.

Moreover since the first clip member 133 is configured to open and close (tilt) with the fulcrum of the connecting portion 135, the load acting on the first clip member 133 largely acts on the tip end portion which is farthest from the fulcrum (the connecting portion) as viewed as a whole. For this reason, in this embodiment, the friction force can be effectively changed by disposing the first contact portion 137a on the tip end portion of the first clip member 133.

Moreover, in this embodiment, more contact portions 137 are provided on the first clip member 133 on which the load acts due to the engagement with the holding groove 26 in the direction in which the clip member opens or closes, rather than the second clip member. Therefore, the magnitude of the friction force which increases or decreases by the load can be increased and the friction force between the first clip member 133 and the drive shaft sleeve 10 can vary greatly. Moreover, a stable contact state between the clip and the drive shaft sleeve 10 can be maintained since the three contact portions 137 are arranged circumferentially on the inner peripheral surface of the two clip members 133, 134 at an equal interval to contact the outer peripheral surface of the drive shaft sleeve (rotator) 10.

As described above, according to the embodiment, it is possible to effectively change the friction force between the cam 130 (the friction clip 131) and the drive shaft sleeve 10 (rotator) due to the engagement of the protrusion 136 in the anti-reverse pawl 20 (the holding groove 26) and consequently it is possible to maintain the fine anti-reverse device feature at the time of reverse-rotation of the drive shaft sleeve 10. Especially when the drive shaft sleeve 10 rotates in the forward direction by the fishing-line winding operation of the handle, the friction force between the cam 130 (the friction clip member 131) and the drive shaft sleeve 10 is largely decreased and consequently it is possible to provide a fishing reel in which the handle can be operated with a small effort. In addition, attrition of the cam 130 (the friction clip 131) is largely reduced and the frequency of component replacement can be reduced, saving the need of maintenance.

Moreover, in the embodiment, the protrusion (engaging portion) 136 of the first clip member 133 serves as a switch-control section for the anti-reverse pawl 20. Therefore compared to the conventional case where the connecting portion serves as the switch-control section, the design constraints may be reduced and the design freedom of the anti-reverse device can be increased.

Furthermore, in the embodiment, the anti-reverse gear 12 and the cam 130 are housed in the cylinder portion 2b and protected from shocks, water and foreign substances. As a result, it is possible to obtain a stable anti-reverse feature. Moreover, the engaging portions of the anti-reverse pawl 20 (the tip end portion 24a engaged with the anti-reverse gear 12 and the holding groove 26 engaged with the cam 130) face the inner side of the cylinder portion 2b and are not exposed to the outer side of the cylinder portion 2b so that they are protected from shocks, water, and foreign substances. Moreover, since only the anti-reverse gear 12 and the cam 130 are housed within the cylinder portion 2b so that the size of the cylinder portion 2b can be made relatively smaller than the case where the whole of the anti-reverse device is housed. Furthermore since the anti-reverse pawl 20 is disposed in the opening 2e which is a part of the cylinder portion 2b, it is possible to reduce the space which the cylinder portion 2b and the anti-reverse pawl 20 occupy.

As described above, according to the embodiment, it is possible to realize the protection of the anti-reverse device and reduction in the size of the fishing spinning reel 1.

Moreover, according to the embodiment, because the components of the friction clip 131 are integrated into a single body, so that there is no possibility that the two clip members 133, 134 are separated from each other when the cam 130 is attached to the drive shaft sleeve 10. Consequently, assembling of the cam 130 to the drive shaft sleeve 10 can be made easier and the number of components can be decreased compared to the case where the first clip member 133, the second clip member 134, and the connecting portion 135 are separately formed. Therefore, it is possible to reduce the number of steps in manufacturing and the labor of assembling. As a result, it is possible to reduce the manufacturing cost of the anti-reverse device.

Although the embodiments of the anti-reverse device have been described above, the present disclosure is not limited to the above embodiments. For instance, the anti-reverse gear 12 and the drive shaft sleeve 10 are formed as a single unit in the above-described embodiment. However, the anti-reverse gear 12 and the drive shaft sleeve 10 can be formed separately and individually.

Although the anti-reverse device (the anti-reverse gear 12, the anti-reverse pawl 20, and the cam 130) is configured to restrict the rotation of the drive shaft sleeve 10 in order to prevent the reverse-rotation of the rotor 3, the anti-reverse device may restrict rotation of the handle shaft 5 to prevent the reverse-rotation of the rotor 3. In other words, the anti-reverse device can restrict any rotator as long as it rotates in association with the rotor 3.

Although the reverse-rotation allowing device (the switch lever or the function piece 50) is provided in the embodiment, the reverse-rotation allowing device (the switch lever or the function piece 50) may not be provided.

Figure 17A:
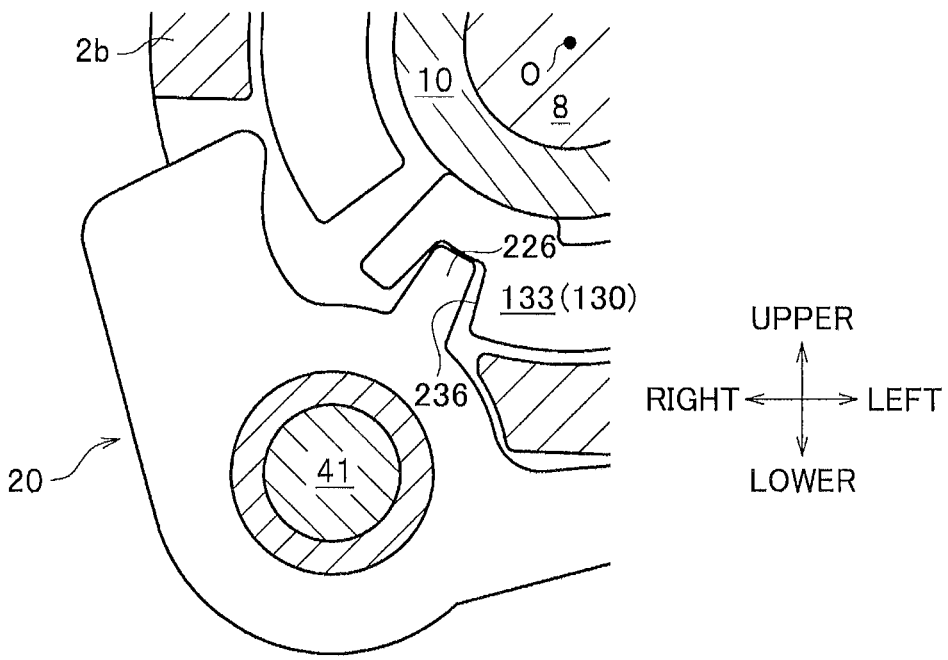
FIG. 17*a* illustrates a first modification example of an engaging portion and an engaged portion.
Figure 17B:
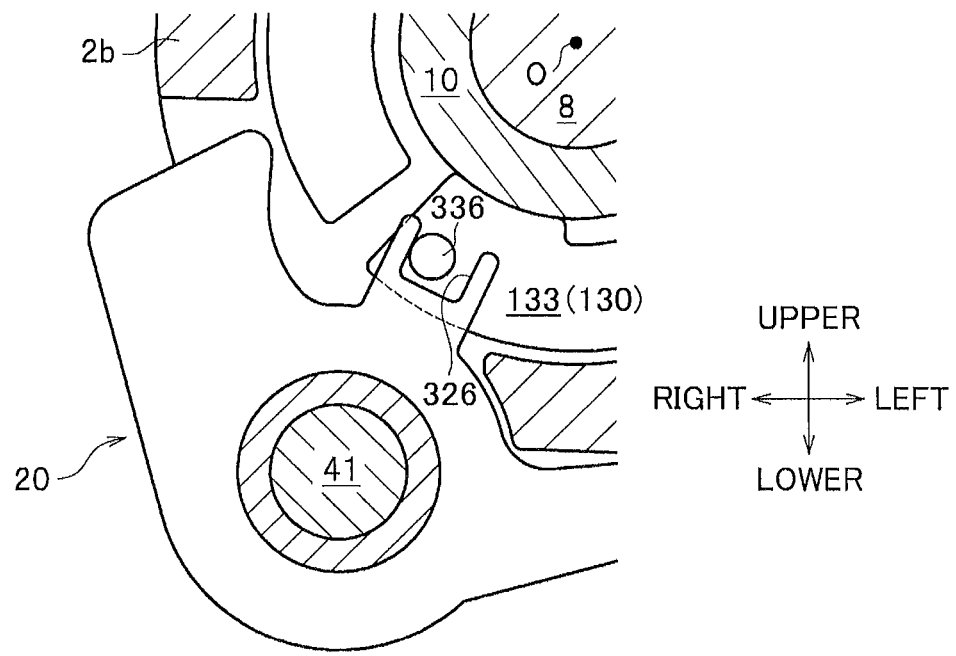
FIG. 17*b* illustrates a second modification example of the engaging portion and the engaged portion.

Although the protrusion 36 protruding radially outward is provided as the engagement structure for the cam 130 to be engaged with the anti-reverse pawl 20 in the embodiment, the engagement means between the cam 130 and the anti-reverse pawl 20 which is applicable to the present disclosure will not be limited to this. The disclosure may adopt any engaging means as long as it can switch between the engagement and disengagement of the anti-reverse pawl 20 with the cam 130 to switch between the reverse-rotation inhibited state and the reverse-rotation allowed state of the anti-reverse pawl 20. For instance, a concave portion (engaging portion) 236 may be formed in the first clip member 133 of the cam 130, and a convex portion (engaged portion) 226 that is engaged in the concave portion (engaging portion) 236 may be formed in the anti-reverse pawl 20 as illustrated in FIG. 17a. Alternatively, a protrusion (engaging portion) 336 protruding in the front side may be formed on the front edge surface of the first clip member 133 and a concave portion (engaged portion) 326 in which the protrusion (engaging portion) 336 engages may be formed in the anti-reverse pawl as illustrated in FIG. 17b.

Figure 18A:
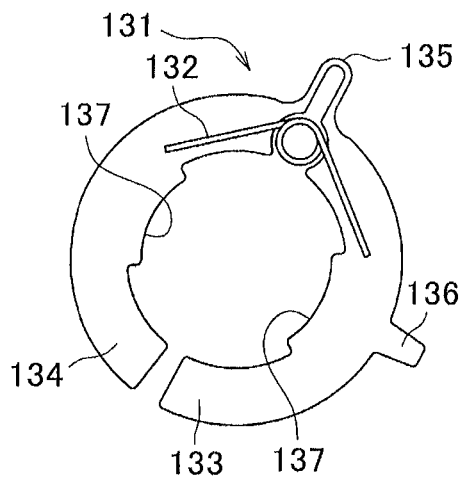
FIG. 18*a* illustrates a first modification example of a friction clip.
Figure 18B:
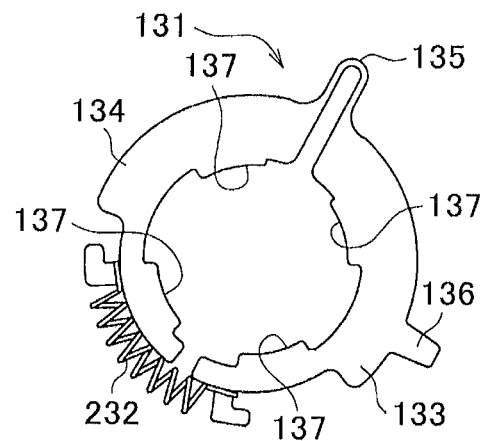
FIG. 18*b* illustrates a second modification example of the friction clip.
Figure 18C:
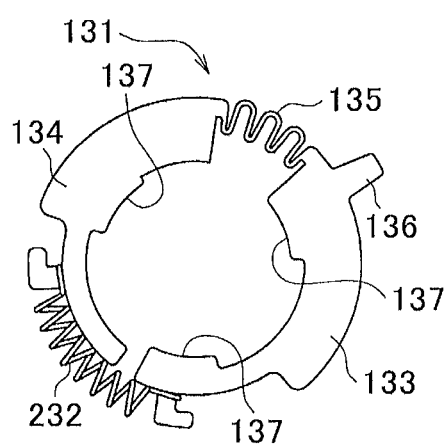
FIG. 18*c* illustrates a third modification example of the friction clip.
Figure 18D:
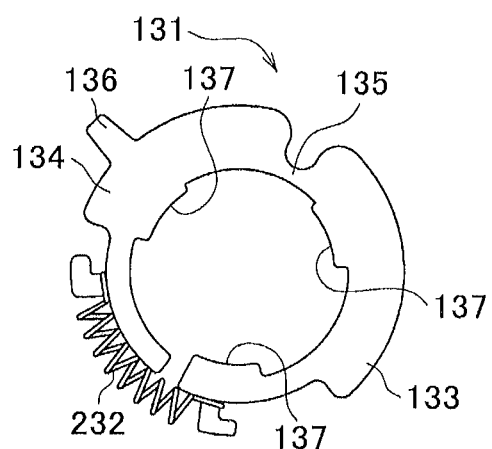
FIG. 18*d* illustrates a fourth modification example of the friction clip.

Although the protrusion (engaging portion) 136 is provided in the first clip member 133 in the embodiment, alternatively the protrusion 136 may be provided in the second clip member 134 (see FIG. 18d). In this case, the protrusion 136 may be provided in the tip end portion or about the middle portion of the second clip member 134. The anti-reverse device illustrated in FIG. 18d can be attached to the handle shaft. In this case, the handle shaft is disposed such that its outer peripheral surface contacts the inner peripheral surface of the contact portions 137. According to this embodiment, the rotation of the drive shaft sleeve 10 in the direction indicated by the arrow B (counterclockwise direction) is the forward rotation caused by the fishing-line winding operation.

Although the protrusion (engaging portion) 136 is provided in the tip end portion of the first clip member 133 in the above-described embodiment, the protrusion 136 may be provided in the base end portion (see FIG. 18c) or about at the middle portion (see FIGS. 18a and 18b).

Although the contact portions 137 (the first to third contact portions 137a-137c) are formed on the first and second clip members 133, 134, alternatively the contact portions 137 may not be necessarily provided. In a case where the contact portions 137 are not provided, a desired friction force can be obtained by adjusting the length of the first and second clip members 133, 134.

Although the three contact portions 137 are provided in the above embodiment, the disclosure is not limited to this configuration. At least one contact portion 137 may be formed on each of the first and second clip members 133, 134. In other words, the total number of the contact portions 137 formed on the first and second clip members 133, 134 may be two, four or more as illustrated in FIGS. 18a and 18b. Although the three contact portions 137 are disposed circumferentially at the equal interval in the above embodiment, the contact portion 137 may be arranged at any positions as long as the stable attachment of the cam 130 is ensured.

Although the connecting portion 135 may have a thin strip shape which circumferentially extends, the shape of the connecting portion 135 is not limited to this. The connecting portion 135 may be formed in any shape provided that it has flexibility. For instance, the connecting portion 135 may be formed in a substantially U-shape protruding radially outward (see FIGS. 18a and 18b) or in a bellows shape (see FIG. 18c). The connecting portion 35 may extend along the inner peripheral surface of the first and second clip members 33, 34 (see FIG. 18d).

Although the torsion spring 132 is used as the bias member to increase the friction force between the first clip member 133 and the second clip member 134, the configuration to increase the friction force between the first clip member 133 and the second clip member 134 which is applicable to the present disclosure is not limited to this. For instance, a coil spring 232 (see FIGS. 18b to 18d) or magnetic force of a permanent magnet cam be used instead of the torsion spring 132. When the permanent magnet is used, for example, two permanent magnets may be provided on the tip end portion of the first clip member 133 and the tip end portion of the second clip member 134 opposing the tip end portion of the first clip member 133 such that they are attracted to each other. In this way, the tip end portion of the first clip member 133 and the tip end portion of the second clip member 134 are biased in the direction in which they are closed, and thereby the clip can be attached to the drive shaft sleeve 10. The coil spring 232 may be disposed on the tip end portions of the first and second clip member 133, 134 rather than the base end portions of the first and second clip member 133, 134 (see FIGS. 18b-18d).

What is claimed is:

1. An anti-reverse device for a fishing reel, comprising:
   an anti-reverse gear provided on a rotator rotated by a handle operation;
   an anti-reverse pawl to be engaged with the anti-reverse gear; and
   a cam controlling engagement and disengagement of the anti-reverse pawl with the anti-reverse gear in accordance with a rotational direction of the rotator, wherein the cam includes:
      a friction clip attached to the rotator and rotating together with the rotator with a friction force between the rotator and the friction clip; and
      a bias member biasing the friction clip in a direction in which a clamping force of the friction clip member is increased,
   wherein the friction clip includes:
      two clip members clipping the rotator;
      a connecting portion connecting the two clip members so as to be openable and closable; and
      an engaging portion formed in one of the two clip members to engage with the anti-reverse pawl.

2. The anti-reverse device for a fishing reel of claim 1, wherein the one of the clip members on which the engaging portion is provided is arranged in a forward rotational direction with respect to the connecting portion.

3. The anti-reverse device for a fishing reel of claim 1, wherein the engaging portion is a protrusion protruding radially outward from the one of the clip members, and the protrusion is configured to engage in a concave portion of the anti-reverse pawl.

4. The anti-reverse device for a fishing reel of claim 1, wherein the engaging portion is disposed in a tip end portion of the one of the clip members.

5. The anti-reverse device for a fishing reel of claim 1, wherein at least one contact portion is provided on each of the two clip members, the contact portion protruding radially inward from an inner peripheral surface of the clip member to contact the rotator.

6. The anti-reverse device for a fishing reel of claim 5, wherein the engaging portion is disposed in a tip end portion of the one of the clip members, and wherein the contact portion is situated closer to the tip end portion of the clip member where the engaging portion is provided.

7. The anti-reverse device for a fishing reel of claim 5, wherein the number of the contact portions provided on the one of the two clip members in which the engaging portion is provided is larger than the number of the contact portions provided on other of the two clip members.

8. The anti-reverse device for a fishing reel of claim 5, wherein three contact portions are provided, and the three contact portions are arranged circumferentially on the inner peripheral surface of the two clip members at an equal interval.

9. The anti-reverse device for a fishing reel of claim 1, wherein the two clip members are formed in individual bodies separated from each other, wherein one end of each of the two clip members is axially supported and wherein other ends of the two clip members are connected to each other by the bias member.

10. The anti-reverse device for a fishing reel of claim 1, wherein the cam is housed within a cylinder portion formed in the reel body.

11. The anti-reverse device for a fishing reel of claim 1, wherein the two clip members are integrally formed as an inseparable single body.

12. The anti-reverse device for a fishing reel of claim 11, wherein the two clip members and the connecting portion are integrally formed as an inseparable single component.

13. The anti-reverse device for a fishing reel of claim 1, wherein the two clip members are formed in individual bodies separated from each other, and the two clip members are inseparably connected to each other by the connecting portion.

14. A fishing reel comprising the anti-reverse device of claim 1.

15. The fishing reel of claim 14, wherein the fishing reel is a spinning reel.

16. The fishing reel of claim 15, wherein the spinning reel comprises:
a reel body having a cylinder portion protruding in a front direction;
a drive shaft sleeve rotatably supported within the cylinder portion; and
a rotor coupled to the drive shaft sleeve,
wherein an opening is formed in a side wall of the cylinder portion,
wherein the anti-reverse gear formed in the drive shaft sleeve and disposed within the cylinder portion;
wherein the cam is attached on the drive shaft sleeve and disposed within the cylinder portion; and
wherein the anti-reverse pawl disposed within the opening to face the anti-reverse gear and the cam.

17. The fishing reel of claim 16, wherein a bearing for supporting the drive shaft sleeve rotatably is fitted within the cylinder portion, and an outer diameter of the cam is smaller than an outer diameter of the bearing.

* * * * *